US 11,905,413 B2

(12) United States Patent
Johnson et al.

(10) Patent No.: US 11,905,413 B2
(45) Date of Patent: Feb. 20, 2024

(54) PROCESS AND A DEVICE ASSEMBLY USEFUL FOR PRODUCING A MOLDED SILICONE RUBBER PRODUCT FROM LIQUID SILICONE RUBBER COMPOSITION VIA INJECTION MOLDING

(71) Applicant: Elkem Silicones USA Corp., East Brunswick, NJ (US)

(72) Inventors: Ted Johnson, Adrian, MI (US); Nicole McMullen, Rock Hill, SC (US); Todd Lawrence, Rock Hill, SC (US); Leeanne Brown, Chester, SC (US)

(73) Assignee: ELKEM SILICONES USA CORP., East Brunswick, NJ (US)

( * ) Notice: Subject to any disclaimer, the term of this patent is extended or adjusted under 35 U.S.C. 154(b) by 538 days.

(21) Appl. No.: 16/940,534

(22) Filed: Jul. 28, 2020

(65) Prior Publication Data

US 2021/0032470 A1    Feb. 4, 2021

Related U.S. Application Data

(60) Provisional application No. 62/880,321, filed on Jul. 30, 2019.

(51) Int. Cl.
*C08L 83/04* (2006.01)
*B29C 45/00* (2006.01)
(Continued)

(52) U.S. Cl.
CPC .......... *C08L 83/04* (2013.01); *B29C 45/0001* (2013.01); *B29C 45/0046* (2013.01);
(Continued)

(58) Field of Classification Search
None
See application file for complete search history.

(56) References Cited

U.S. PATENT DOCUMENTS 3,884,866 A    5/1975    Jeram et al.
4,162,243 A    7/1979    Lee et al.
(Continued)

FOREIGN PATENT DOCUMENTS

EP    0704492 A2    4/1996
EP    1130060 A1    9/2001
(Continued)

OTHER PUBLICATIONS

International Search Report for Application No. PCT/US2020/043889 dated Nov. 5, 2020.

*Primary Examiner* — Jacob T Minskey
*Assistant Examiner* — Adrien J Bernard
(74) *Attorney, Agent, or Firm* — McBee Moore & Vanik, IP, LLC

(57) ABSTRACT

The invention relates to a device assembly and methods useful for producing molded silicone rubber products from liquid silicone rubber compositions ("LSR") via injection molding. The methods provide a flexible process to produce faster cured silicone rubber products from LSR and allow for use of low curing temperature in the molding cavities without drastically lowering cure speed of the LSR and the physical properties of the produced molded silicone rubber material, therefore allowing liquid silicone rubber overmolding on or over heat sensitive substrates. The device assembly of the invention allows a faster cycle and the use of precise dosing and mixing units thus creating a flexible process to produce cured silicone rubber products faster from liquid silicone rubber (LSR).

12 Claims, 3 Drawing Sheets

(51) Int. Cl.
  *B29C 45/77* (2006.01)
  *B29K 83/00* (2006.01)
  *B29K 105/00* (2006.01)

(52) U.S. Cl.
  CPC .... *B29C 45/77* (2013.01); *B29C 2945/76545* (2013.01); *B29C 2945/76809* (2013.01); *B29K 2083/005* (2013.01); *B29K 2105/0014* (2013.01); *C08L 2205/025* (2013.01); *C08L 2205/035* (2013.01)

(56) References Cited

U.S. PATENT DOCUMENTS

| | | |
|---|---|---|
| 5,977,220 A | 11/1999 | Burkus et al. |
| 6,034,199 A | 3/2000 | McDermott et al. |
| 6,464,923 B2 | 10/2002 | Tsuji et al. |
| 8,063,167 B2 | 11/2011 | Kajita et al. |
| 8,198,357 B2 | 6/2012 | Jeram et al. |
| 9,556,013 B2 | 1/2017 | Waizenauer et al. |
| 2011/0245403 A1* | 10/2011 | Jeram .................. B29C 67/246 524/506 |

FOREIGN PATENT DOCUMENTS

| | | | |
|---|---|---|---|
| EP | 2896658 A1 | 7/2015 | |
| JP | 2005227701 A | 8/2005 | |
| JP | 2019504919 A | 2/2019 | |
| WO | WO-2008056810 A1 * | 5/2008 | ................ C08J 5/12 |
| WO | 2010014722 A1 | 2/2010 | |
| WO | 2017144461 A1 | 8/2017 | |
| WO | 2018236127 A1 | 12/2018 | |
| WO | 2019024432 A1 | 2/2019 | |

* cited by examiner

PROCESS AND A DEVICE ASSEMBLY USEFUL FOR PRODUCING A MOLDED SILICONE RUBBER PRODUCT FROM LIQUID SILICONE RUBBER COMPOSITION VIA INJECTION MOLDING

CROSS REFERENCE TO RELATED APPLICATIONS

This application claims priority to U.S. Provisional Patent Application No. 62/880,321, filed 30 Jul. 2019, the content of which is hereby incorporated by reference in its entirety.

BACKGROUND

Field

The invention relates to a new method and a device assembly useful for producing molded silicone rubber products from liquid silicone rubber compositions ("LSR") via injection molding.

Description of Related Art

Liquid silicone rubber injection molding device assembly using liquid silicone rubber ("LSR") compositions to form molded silicone rubber products have been around for almost five decades. LSR compositions which react by addition-crosslinking are known in the field of silicone rubbers.

LSR compositions belong to the group of heat-curing rubbers. A characteristic feature is their low viscosity during processing compared to solid silicones or elastomers. Two-component mixtures increasingly crosslink by the addition process. This means that the reaction takes place without any decomposition product forming. This is an important benefit for the injection molding field since there are no byproducts of cure and there is no concern of deposits forming on the molds.

As was previously done with rubber processing equipment, plastics processing equipment was soon adapted for manufacturing LSR products. Injection molding of LSR compositions is often the preferred choice of producers of silicone rubber parts. That is because it provides businesses ease of processing, high-volume molding, consistent part quality and improved productivity. Injection molding of LSR is performed with a suitable injection molding press specifically designed for LSR.

Typically, a two-part platinum catalyzed addition cure reaction is used to make LSR molded rubber products, wherein the first component is a mixture of vinylsiloxane polymers, treated amorphous fumed silica, and platinum catalyst (component A or Part-A) and the second component is a mixture of vinylsiloxane polymers, treated amorphous fumed silica, hydrogen siloxane crosslinking polymers, and a cure rate inhibitor (component B or Part-B). Since the LSR compositions are shipped as two-part drums (20 liters or 200 liters) from the manufacturer, the removal of the component A and component B materials is performed by dosing units designed for LSR. In these pumping units, a circular device having the same diameter of the drum called "follower plate" is pressed into the drum, displacing the material into a feedline hose under the applied pressure. Piston-pumps are installed as conveyor and pumps. The two components pass through conduits to a mixing unit in which they are brought together for the first time. Both pumps are set to run synchronously to achieve a desired 1:1 mixing ratio. A static mixer, through which the material components are run before delivery to the injection molding press, is installed downstream for further homogeneous mixing. For the additives (pigments, color agent or others), dosing systems having separate dosing valves are used.

In this step, dosing and mixing units are key steps as precise metering for mixing the A and B parts, and adding additives, is essential and challenging. Indeed, off-ratio metering and mixing of the two separate components will result in unbalanced ratio of siloxane hydride polymers to siloxane alkenyl polymers present in crosslinkable LSR composition which is prepared prior to injection molding. This can result in erratic injection cure rates and cured parts with variable physical properties.

The A and B mixture is further mixed in the LSR machine transferring screw prior to injection into a mold. Inhibitors for hydrosilylation vulcanizing reactions are key chemicals used in LSR compositions, since if no inhibitor is used, the crosslinking reaction may begin immediately after mixing the two components even at room temperature. Therefore, the level of inhibitor is a key parameter necessary to give the required processing time before the crosslinking reactions start. The A and B mixture is then heat cured for a specific time and temperature depending on the part size. The finished cured product is ejected from the mold, with the aid of a robotic device, etc., and the process repeated.

Examples of prior art include U.S. Pat. No. 3,884,866 which discloses a two-part LSR process using two different vinylsiloxane polymers, a platinum catalyst, and pre-treated silica filler for the first component, and the same vinylsiloxane polymers and pretreated silica filler plus a silyl hydride containing organopolysiloxane and cure rate inhibitor as the second component. U.S. Pat. No. 4,162,243 discloses a two-part LSR process using an in situ treated amorphous silica filler. U.S. Pat. No. 5,977,220 discloses a two-part LSR process using a nitrogen organic cation salt to improve the compression set of the silicone mixture. U.S. Pat. No. 6,034,199 discloses a two-part LSR process with improved cure rate inhibitors. U.S. Pat. No. 6,464,923 discloses a three-part LSR process. The first component is a diorganopolysiloxane polymer and inorganic filler; the second component is a liquid catalyst and diorganopolysiloxane polymer mixture; and the third component is hydrogen siloxane mixed with an organopolysiloxane polymer. The patent also discloses the use of carbon black as an inorganic filler. The three separate parts result in improved storage stability over a two-part LSR process.

In summary all the standard LSR processes described above have several problems. The first problem is linked to off-ratio metering and mixing of the two separate components which can result in an unbalanced amount of silicone hydride crosslinker present in the finished products yielding to erratic injection cure rates and cured parts with variable physical properties. The second problem is the need for expensive equipment to pump the two separate mixtures into the metering and mixing device. The third problem is the large and specific (non-variable or set) amount of inhibitor present in the component B that is required to obtain a multi-day room temperature work life. The inhibitor level can slow down the cure rate of the molded product which will allow for a longer work life.

In a different approach, U.S. Pat. Nos. 8,063,137 and 8,198,357 described a method for producing a molded silicone rubber product using a liquid silicone rubber (LSR) base comprising at least one vinyl siloxane polymer, at least one hydride crosslinker, and optionally at least one inhibitor for hydrosilylation vulcanizing reactions but no catalyst is present in such base. The single LSR base is then fed into a mixing device, and into the mixing device are also fed an inhibitor masterbatch comprising at least one liquid inhibitor for hydrosilylation vulcanizing reactions and at least one vinyl siloxane polymer, and a catalyst masterbatch comprising at least one catalyst and at least one vinyl siloxane polymer. The molding is then performed allowing for some cycle time improvements. However, there is still a need for improving the productivity of the injection molding cycle especially when low temperature curing is needed, for example at temperatures from between 80 to 120° C. and without deteriorating the cure speed.

Indeed, it is well known that the vulcanization speed of liquid silicone rubber depends on three main factors: temperature of mold, geometry thickness of the part (gap between the heated surfaces of the mold and relation between surface area and volume) and general vulcanization behavior and the chemistry of the curing. The cycle times can be reduced (and therefore productivity increased) by increasing the mold temperature, cold runner is set to 40-80° C. with the use of a temperature controller and using a faster-curing material. However, using a faster curing material implies modifying the composition of the liquid silicone rubber raw material, allowing for variable behavior over the wide range of injection molding apparatus that are already available for injection molders.

Furthermore, there is a strong demand for device assemblies that can allow for improvement of the productivity of the injection molding cycle while allowing for greater flexibility of the manufacture of molded silicone rubber products.

In addition, LSR composition may also be used to overmold thermoplastics objects or substrates. However, many non-silicone substrates such as thermoplastic materials tend to deform at elevated temperature (such as 160° C. or more) because of their composition. Indeed, thermoplastic plastic materials do not exhibit exact melting points marking the transition from a solid to liquid, but they undergo a slow softening as temperature increases. Two different techniques were then introduced describing either surface softening (Vicat softening temperature) or body softening (Heat Deflection (or distortion) Temperature or HDT).

The Vicat softening temperature is the temperature at which a flat-ended needle penetrates the specimen to the depth of 1 mm under a specific load (10 N or 50 N, see ASTM D 1525-09 and ISO 306). The Vicat softening temperature reflects the point of softening to be expected when a material is used in an elevated temperature application.

In the Heat Deflection Temperature method such as in ASTM D 648-07, a deflection temperature is measured at which an arbitrary deformation occurs when specimens are subjected to an arbitrary set of testing conditions reflecting a polymer's ability to bear a given load at elevated temperatures.

Examples of heat sensitive materials having a Vicat Softening Temperature (with 1 kg load) below 160° C. and which may be damaged by crosslinking at their surface a LSR composition are: polyvinyl chloride (PVC, 92° C.), polyethylene (PE, 127.3° C.), polypropylene (PP, 152.2° C.), acrylonitrile butadiene styrene (ABS, 102.3° C.) and polycarbonate (PC, 156.2° C.).

Therefore, liquid silicone rubber overmolding on or overheat sensitive substrates such as thermoplastic objects is challenging without quality losses. Furthermore, as silicone rubber crosslinked materials can act as protective covers against dust, water, impact, heat and electrical shock, it could find a wide use in implantable devices wherein thermal sensitive plastic material are widely used. Other applications that could benefit by solving the challenge of overmolding LSR compositions onto thermal sensitive plastic substrates are: medical encapsulation of electronics, overmolded gaskets, surgical handles, radio opaque markers for positioning medical devices, wearables, keypads, guarding, electrical and thermal Insulation.

However, lowering the molding temperature in a standard LSR injection-molding process drastically reduces the cure speed of the liquid silicone rubber which is not acceptable as it will have a punitive impact on its economic viability.

Therefore, there is still a need of providing a new flexible method of preparing molded silicone rubber products using LSR compositions that will allow unambiguously reproducible production conditions, using fully automated production sequence and, if needed, allowing to drastically lower the curing temperature in the mold cavities (below 160° C., below 140° C., below 120° C., below 110° C. or below 100° C.) without lowering cure speed of the LSR and the physical properties of the produced molded silicone rubber material.

BRIEF SUMMARY OF THE INVENTION

One object of the present invention is to provide a flexible process to produce faster cured silicone rubber products from liquid silicone rubber (LSR).

Another object of the invention is to provide a new flexible process that allows to use low curing temperature in the molding cavities (below 160° C., below 140° C., below 120° C., below 110° C. or below 100° C.) without drastically lowering cure speed of the LSR and the physical properties of the produced molded silicone rubber material, therefore allowing liquid silicone rubber overmolding on or over heat sensitive substrates.

Another object of the invention is to provide a device assembly useful for producing a molded silicone rubber product via injection molding that allows a faster cycle and the use of the precise dosing and mixing units thus creating a flexible process to produce cured silicone rubber products faster from liquid silicone rubber (LSR).

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

FIG. 3 also shows a derivative curve (labelled 1), which is the slope of the cure curve.

DETAILED DESCRIPTION OF THE INVENTION

Figure 1:
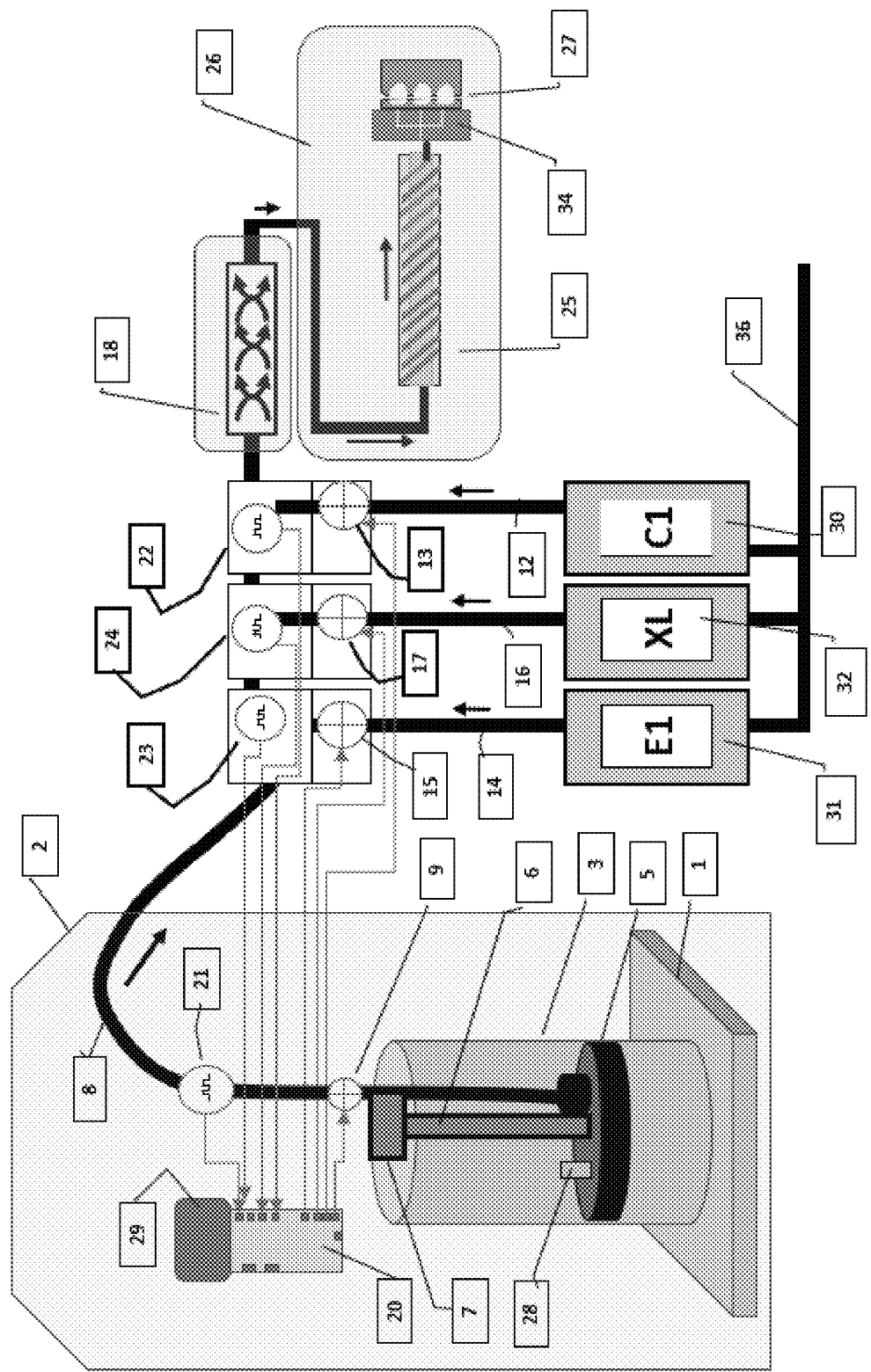
FIG. 1 is a schematic representation of a device assembly useful for producing a molded silicone rubber product via a method according to the invention and via injection molding wherein the inhibitor masterbatch E1 (31), the catalyst masterbatch C1 (30) and the crosslinker XL (32) are separate from the liquid silicone rubber base A1 (3) which does not contain a catalyst, and are fed into a mixing tank (18), which is preferably a static mixer (18), prior to their introduction into the barrel (25) of the injection molding press. In this Figure, the optional presence of an additive separate feed line and container is not represented.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Such objectives, among others, is achieved by the present invention, which relates to a method useful for producing a molded silicone rubber product M1 via injection molding comprising the following steps:

a) feeding into a base feed line a liquid silicone rubber base composition A1 which does not contain a catalyst, and which comprises:
  at least one organopolysiloxane A containing at least 2 alkenyl groups bonded to silicon atoms per molecule,
  optionally at least one organopolysiloxane B containing at least 2 silicon-bonded hydrogen atoms per molecule B; and preferably at least 3 silicon-bonded hydrogen atoms per molecule B,
  optionally, at least one filler C,
  optionally at least one inhibitor E for hydrosilylation vulcanizing reaction, and
  optionally at least one additive F,
b) feeding into a separate catalyst feed line a catalyst masterbatch C1 comprising at least one platinum-based catalyst D,
c) feeding into a separate feed line an inhibitor masterbatch E1 comprising at least one inhibitor E for hydrosilylation vulcanizing reaction,
d) feeding either into a separate feed line or into any feedline containing the catalyst masterbatch C1 or the inhibitor masterbatch E1 at least one crosslinker XL which is an organopolysiloxane containing at least three silicon-bonded hydrogen atoms per molecule when it is a linear or a cyclic polymer or at least two silicon-bonded hydrogen atoms per molecule when it is a branched polymer, and preferably at least three silicon-bonded hydrogen atoms per molecule when it is a branched polymer,
e) optionally feeding into a separate additive feed line at least one additive F,
f) directing said liquid silicone rubber base composition A1, said catalyst masterbatch C1, said crosslinker XL, said inhibitor masterbatch E1 and optionally said additive F either into a mixing tank (18) prior directing the resulting mixture into a barrel of an injection machine or directly into said barrel to obtain a crosslinkable liquid silicone rubber composition A3 comprising:
  1) at least one organopolysiloxane A containing at least 2 alkenyl groups bonded to silicon atoms per molecule,
  2) optionally at least organopolysiloxane B containing at least 2 silicon-bonded hydrogen atoms per molecule B; and preferably at least 3 silicon-bonded hydrogen atoms per molecule B,
  3) optionally, at least one filler C,
  4) at least one platinum-based catalyst D,
  5) at least one inhibitor E for hydrosilylation vulcanizing reaction,
  6) at least one crosslinker XL which is an organopolysiloxane containing at least three silicon-bonded hydrogen atoms per molecule when it is a linear or a cyclic polymer or at least two silicon-bonded hydrogen atoms per molecule when it is a branched polymer, and
  7) optionally at least one additive F; and
wherein the added amounts in said crosslinkable liquid silicone rubber composition A3 of said platinum-based catalyst D and said inhibitor E for hydrosilylation vulcanizing reaction are controlled and adjusted so as to get a molar ratio of the inhibitor E for hydrosilylation vulcanizing reaction to platinum atom of the platinum-based catalyst D which ranges from 0.1 to 900 (0.1:1 to 900:1), most preferably from 10 to 900 (10:1 to 900:1), and even more preferably from 20 to 250 (20:1 to 250:1),
g) directing said crosslinkable liquid silicone rubber composition A3 into a mold which is installed in a molding press and curing it, preferably by heating at a temperature ranging from 80° C. to up to 220° C., so as to obtain a molded silicone rubber product M1.

To achieve this objective, the Applicant demonstrated, to its credit, entirely surprisingly and unexpectedly, that molding in an injection molding machine a crosslinkable liquid silicone rubber composition A3 according to the invention and which is specifically prepared by feeding via distinct feed lines an inhibitor master batch E1, a liquid silicone rubber base A1 and a catalyst master batch C1 and feeding either into a separate feed line or into any feedline containing the catalyst masterbatch C1 or the inhibitor masterbatch E1 the crosslinker XL so as:
  1) to control the added amount of the crosslinker XL, and
  2) to keep within said liquid silicone rubber composition A3 and just prior the injection molding step, a molar ratio of the inhibitor E for hydrosilylation vulcanizing reaction to platinum atom of the platinum-based catalyst D within a range from 0.1 to 900 (0.1:1 to 900:1), most preferably from 10 to 900 (10:1 to 900:1), and even more preferably from 20 to 250 (20:1 to 250:1),
  allow to drastically improve the optimum cure time at 110° C. at which 90% of cure has taken place (Tc90), as measured by a moveable die rheometer (MDR) at 110° C. without a severe loss of cure speed as compared to the method described in prior art U.S. Pat. Nos. 8,063,137 and 8,198,357.

Indeed, it is now possible to obtain an optimum cure time at 110° C. at which 90% of cure has taken place (Tc90) well below 30 seconds and cure times at 110° C. at which 10% of cure has taken place (Tc10) well below 20 seconds which suppress a post cure step usually required after the object is removed from the mold which may include a residence time of several hours in a heated oven.

Advantages of reducing the curing (or molding) temperature without significant loss of cure speed are numerous and include energy saving by operating moldings at lower temperatures.

Another advantage of the invention is that it allows a flexibility on choosing a lower curing temperature (between 80° to 120° C.) without deteriorating the optimum cure speed of the LSR material and hence allowing overmolding over a thermal sensitive material. Thermal sensitive materials are those that will encounter distortion or deformation problem upon heat contact.

The process of the invention allows to use efficiently a molding temperature ranges from 80° C. to 220° C., from 80° C. to 160° C., from 80° to 140° C., from 80° C. to below 120° C., from 80° C. to below 110° C. or from 80° C. to below 100° C. without deteriorating the optimum cure speed of the LSR material.

In addition, with faster cure times at standard, elevated temperature, cycle time savings can be obtained for standard, molded products.

In a preferred embodiment the invention concerns a method useful for producing a molded silicone rubber product M1 via injection molding comprising the following steps:
  a) feeding into a base feed line (8) a liquid silicone rubber base composition A1 which does not contain a catalyst, and which comprises:
    at least one organopolysiloxane A containing at least 2 alkenyl groups bonded to silicon atoms per molecule,
    optionally at least one organopolysiloxane B containing at least 2 silicon-bonded hydrogen atoms per molecule B; and preferably at least 3 silicon-bonded hydrogen atoms per molecule B,
    optionally at least one filler C,
    optionally at least one inhibitor E for hydrosilylation vulcanizing reaction, and
    optionally at least one additive F,
  b) feeding into a separate catalyst feed line (12) a catalyst masterbatch C1 comprising at least one platinum-based catalyst D,
  c) feeding into a separate feed line (14) an inhibitor masterbatch E1 comprising at least one inhibitor E for hydrosilylation vulcanizing reaction,
  d) feeding into a separate feed line (16) at least one crosslinker XL which is an organopolysiloxane containing at least three silicon-bonded hydrogen atoms per molecule when it is a linear or a cyclic polymer, or at least two silicon-bonded hydrogen atoms per molecule when it is a branched polymer, and preferably at least three silicon-bonded hydrogen atoms per molecule when it is a branched polymer,
  e) optionally feeding into a separate additive feed line (38) at least one additive F,
  f) directing said liquid silicone rubber base composition A1, said catalyst masterbatch C1, said crosslinker XL, said inhibitor masterbatch E1 and optionally said additive F either into a mixing tank (18) prior directing the resulting mixture into a barrel of an injection machine or directly into said barrel to obtain a crosslinkable liquid silicone rubber composition A3 comprising:
    1) at least one organopolysiloxane A containing at least 2 alkenyl groups bonded to silicon atoms per molecule,
    2) optionally at least organopolysiloxane B containing at least 2 silicon-bonded hydrogen atoms per molecule B; and preferably at least 3 silicon-bonded hydrogen atoms per molecule B,
    3) optionally, at least one filler C,
    4) at least one platinum-based catalyst D,
    5) at least one inhibitor E for hydrosilylation vulcanizing reaction,
    6) at least one crosslinker XL which is an organopolysiloxane containing at least three silicon-bonded hydrogen atoms per molecule when it is a linear or a cyclic polymer, or at least two silicon-bonded hydrogen atoms per molecule when it is a branched polymer, and
    7) optionally at least one additive F; and
  wherein the added amounts in said crosslinkable liquid silicone rubber composition A3 of said platinum-based catalyst D and said inhibitor E for hydrosilylation vulcanizing reaction are controlled and adjusted so as to get a molar ratio of the inhibitor E for hydrosilylation vulcanizing reaction to platinum atom of the platinum-based catalyst D which ranges from 0.1 to 900 (0.1:1 to 900:1), most preferably from 10 to 900 (10:1 to 900:1), and even more preferably from 20 to 250 (20:1 to 250:1),
  g) directing said crosslinkable liquid silicone rubber composition A3 into a mold which is installed in a molding press and curing it, preferably by heating at a temperature ranging from 80° C. to up to 220° C., so as to obtain a molded silicone rubber product M1.

Suitable crosslinker XL that is fed in a separate feed line and which is a linear organopolysiloxane containing at least three silicon-bonded hydrogen atoms per molecule, a cyclic organopolysiloxane polymer containing at least three silicon-bonded hydrogen atoms per molecule, or a branched organopolysiloxane polymer containing at least three silicon-bonded hydrogen atoms per molecule.

In another preferred embodiment, the crosslinker is a mixture of at least one linear organopolysiloxane containing at least three silicon-bonded hydrogen atoms per molecule and at least one branched organopolysiloxane polymer containing at least three silicon-bonded hydrogen atoms per molecule.

By "branched organopolysiloxane polymer" it is meant an organopolysiloxane polymer having in its structure a Q siloxy unit of formula $SiO_{4/2}$ or a T siloxy unit of formula $RSiO_{3/2}$, formula in which R is a hydrogen atom or a one to forty carbon atom monovalent hydrocarbon radical, preferably a one to twenty carbon monovalent hydrocarbon radical, more preferably selected from the group consisting of methyl, ethyl, propyl, iso-propyl, n-butyl, iso-butyl, sec-butyl, tert-butyl, pentyl, hexyl, heptyl, phenyl, benzyl, and mesityl; and most preferably selected from the group consisting of methyl and phenyl.

In a preferred embodiment, the crosslinker XL is an organopolysiloxane containing at least three silicon-bonded hydrogen atoms per molecule and is a branched polymer which means an organopolysiloxane containing at least two silicon-bonded hydrogen atoms and having in its structure a Q siloxy unit of formula $SiO_{4/2}$ or a T siloxy unit of formula $RSiO_{3/2}$, formula in which R is a hydrogen atom or a one to forty carbon atom monovalent hydrocarbon radical, preferably a one to twenty carbon monovalent hydrocarbon radical, more preferably selected from the group consisting of methyl, ethyl, propyl, iso-propyl, n-butyl, iso-butyl, sec-butyl, tert-butyl, pentyl, hexyl, heptyl, phenyl, benzyl, and mesityl; and most preferably selected from the group consisting of methyl and phenyl. Other standard siloxy units may also be present such as M siloxy unit of formula $R_3SiO_{1/2}$ or D siloxy unit of formula $R_2SiO_{2/2}$, formulas in which the symbols R are identical or different and are chosen among a hydrogen atom or a one to forty carbon atom monovalent hydrocarbon radical, preferably a one to twenty carbon monovalent hydrocarbon radical, more preferably selected from the group consisting of methyl, ethyl, propyl, iso-propyl, n-butyl, iso-butyl, sec-butyl, tert-butyl, pentyl, hexyl, heptyl, phenyl, benzyl, and mesityl; and most preferably selected from the group consisting of methyl and phenyl.

Such component acts as a cross-linker for organopolysiloxane A, by the addition reaction of the silicon-bonded hydrogen atoms of the crosslinker XL with the alkenyl groups of organopolysiloxane A ingredient in the presence of a catalyst mentioned below to form a network structure therewith and thereby cure the composition.

Examples of suitable crosslinkers XL containing at least three silicon-bonded hydrogen atoms per molecule when it is a linear include but are not limited to: trimethylsiloxy-endblocked methylhydrogenpolysiloxanes; trimethylsiloxy-endblocked dimethylsiloxane-methylhydrogensiloxane copolymers; trimethylsiloxy-endblocked methylhydrogensiloxane-methylphenylsiloxane copolymers; trimethylsiloxy-endblocked dimethylsiloxane-methylhydrogensiloxane-methylphenylsiloxane copolymers; dimethylhydrogensiloxy-endblocked dimethylpolysiloxanes; dimethylhydrogensiloxy-endblocked methylhydrogenpolysiloxanes; dimethylhydrogensiloxy-endblocked dimethylsiloxanes-methylhydrogensiloxane copolymers; dimethylhydrogensiloxy-endblocked dimethylsiloxane-methylphenylsiloxane copolymers and dimethylhydrogensiloxy-endblocked methylphenylpolysiloxanes.

The viscosity is typically from 0.001 to 100 Pa·s at 25° C., preferably from 0.001 to 1 Pa·s. at 25° C. in order to obtain a good miscibility with other ingredients.

In a preferred embodiment, when the crosslinkers XL containing at least three silicon-bonded hydrogen atoms per molecule is a linear it is chosen among those containing less than 15 mmol/g of SiH per molecule.

Examples of suitable crosslinkers XL containing at least two silicon-bonded hydrogen atoms per molecule when it is a branched polymer include branched polymers of formula (I):

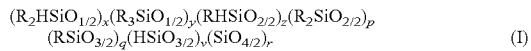

$(R_2HSiO_{1/2})_x(R_3SiO_{1/2})_y(RHSiO_{2/2})_z(R_2SiO_{2/2})_p$
$(RSiO_{3/2})_q(HSiO_{3/2})_v(SiO_{4/2})_r$  (I)

where H is hydrogen and R is a one to forty carbon atom monovalent hydrocarbon radical, preferably a one to twenty carbon monovalent hydrocarbon radical, more preferably selected from the group consisting of methyl, ethyl, propyl, iso-propyl, n-butyl, iso-butyl, sec-butyl, tert-butyl, pentyl, hexyl, heptyl, phenyl, benzyl, and mesityl; and most preferably selected from the group consisting of methyl and phenyl, and where x≥2, y≥0, z≥0, p≥0, and at least one of q or 1; alternatively x≥2, y≥0, z≥0, p≥0, q≥0; v≥0, r≥1; alternatively, x≥2, y≥0, r≥1 (with the proviso that when r=1, x+y=4) and z, p, q, v=0. Alternatively, x>2, y>0, r>1 and z, p, q, v=0.

Specific crosslinkers XL containing at least two silicon-bonded hydrogen atoms per molecule when it is a branched polymer include but are not limited to: silicone resins $M^HQ$ comprising: $(H)(CH_3)_2SiO_{1/2}$ siloxy units ($M^H$) and $SiO_{4/2}$ siloxy units (Q units), silicone resins $MM^HG$) comprising: $(CH_3)_3SiO_{1/2}$ siloxy units (M), $(CH_3)_2HSiO_{1/2}$ siloxy units ($M^H$) and $SiO_{4/2}$ (Q), silicone resins $M^HD^HQ$ comprising: $(CH_3)_2HSiO_{1/2}$ siloxy units ($M^H$), $(CH_3)HSiO_{2/2}$ ($D^H$) and $SiO_{4/2}$ siloxy units (Q) and silicone resins $MM^HD^HQ$ comprising: $(CH_3)_3SiO_{1/2}$ units (M units), $(CH_3)_2HSiO_{1/2}(M^H)$, $(CH_3)HSiO_{2/2}(D^H)$ and $SiO_{4/2}$ units (Q).

In a preferred embodiment, the crosslinker XL is a $M^HQ$ silicone resin comprising at least two, and preferably at least three, $M^H$ siloxy units of formula $R_2HSiO_{1/2}$ and Q siloxy unit of formula $SiO_{4/2}$, formulas where H is a hydrogen atom and where R is a one to forty carbon atom monovalent hydrocarbon radical, preferably a one to twenty carbon monovalent hydrocarbon radical, more preferably selected from the group consisting of methyl, ethyl, propyl, iso-propyl, n-butyl, iso-butyl, sec-butyl, tert-butyl, pentyl, hexyl, heptyl, phenyl, benzyl, and mesityl; and most preferably selected from the group consisting of methyl and phenyl.

In a preferred embodiment the crosslinker XL is a MHQ silicone resin having the formula:

$M^H_wQ_z$ where Q has the formula $SiO_{4/2}$ and where $M^H$ has the formula $R_2HSiO_{1/2}$, where H is a hydrogen atom and R is a one to forty carbon atom monovalent hydrocarbon radical, preferably a one to twenty carbon monovalent hydrocarbon radical, more preferably selected from the group consisting of methyl, ethyl, propyl, iso-propyl, n-butyl, iso-butyl, sec-butyl, tert-butyl, pentyl, hexyl, heptyl, phenyl, benzyl, and mesityl; and most preferably selected from the group consisting of methyl and phenyl, with the subscripts w and z having a ratio of 0.5 to 4.0 respectively, preferably 0.6 to 3.5, more preferably 0.75 to 3.0, and most preferably 1.0 to 3.0.

In another preferred embodiment the crosslinker XL is a $M^HQ$ silicone resin having the formula:

$(M^H_wQ_z)_j$ where Q has the formula $SiO_{4/2}$ and where $M^H$ has the formula $R_2HSiO_{1/2}$, where H is a hydrogen atom and R is a one to forty carbon atom monovalent hydrocarbon radical, preferably a one to twenty carbon monovalent hydrocarbon radical, more preferably selected from the group consisting of methyl, ethyl, propyl, iso-propyl, n-butyl, iso-butyl, sec-butyl, tert-butyl, pentyl, hexyl, heptyl, phenyl, benzyl, and mesityl; and most preferably selected from the group consisting of methyl and phenyl, with the subscripts w and z having a ratio of 0.5 to 4.0 respectively, preferably 0.6 to 3.5, more preferably 0.75 to 3.0, and most preferably 1.0 to 3.0; and the subscript j ranging from about 2.0 to about 100, preferably from about 2.0 to about 30, more preferably from about 2.0 to about 10, and most preferably from about 3.0 to about 5.0.

In another preferred embodiment, the crosslinker XL is a silicone resin having from 0.10 wt. % to 2.00 wt. % H as SiH and comprising $M^H$ siloxy units of formula $R_2HSiO_{1/2}$ and Q siloxy unit of formula $SiO_{4/2}$, where H is a hydrogen atom and R is a one to forty carbon atom monovalent hydrocarbon radical, preferably a one to twenty carbon monovalent hydrocarbon radical, more preferably selected from the group consisting of methyl, ethyl, propyl, iso-propyl, n-butyl, iso-butyl, sec-butyl, tert-butyl, pentyl, hexyl, heptyl, phenyl, benzyl, and mesityl; and most preferably selected from the group consisting of methyl and phenyl.

Examples of suitable commercial $M^HQ$ silicone resins are: Silmer® HQ20 (ratio M/Q is 2:1, wt. % of H as SiH=0.65%) and HQ203 (ratio M/Q is 1.2:1, wt. % of H as SiH=0.12%) sold by Siltech, silicone resins HQM®-105 & HQM-107 sold by Gelest.

The most preferred $M^HQ$ silicone resin is a $M^HQ$ silicone resin containing siloxy units of formula $R_2HSiO_{1/2}$ and $SiO_{4/2}$, formulas in which H is a hydrogen atom and R is methyl having 1.10 to 1.30% wt. % of H as SiH.

In another preferred embodiment, the crosslinkers according to the invention are chosen among the following group and their corresponding mixtures:

XL1=Polyphenyl-(dimethylhydrosiloxy)siloxane hydride terminated, from Gelest, reference HDP-111, viscosity 50 to 80 mPa·s, total SiH mmol/g=5.2; silicone resin of formulae $(M^H)_{2+n}(T^{Ph})_n$ with $M=R_2HSiO_{1/2}$ siloxy unit and $T^{Ph}=PhSiO_{3/2}$, formulas where H is a hydrogen atom, R is methyl and Ph is phenyl;

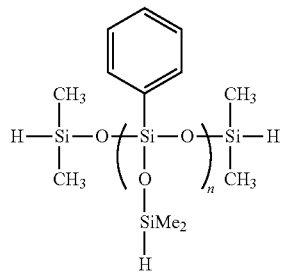

XL1

XL2: copolymer of dimethylsiloxane and methylhydrogensiloxane partially capped at both molecular terminals with di-methylhydrogensiloxy groups (viscosity of 18 to 26 mPa·s; total SiH mmol/g=7.2 (linear crosslinker).

XL3: $M^HQ$ silicone resin of $R_2HSiO_{1/2}$ and Q siloxy unit of formula $SiO_{4/2}$, formulas where H is a hydrogen atom and where R is methyl, total SiH mmol/g=7.3 (from Milliken, reference SiVance MQH-8 MQ Hydride Resin).

XL4: Branched silicone resin of formulae $M^HQ$ with $M^H=R_2HSiO_{1/2}$ and Q is a siloxy unit of formula $SiO_{4/2}$, formulas where H is a hydrogen atom and where R is methyl, total SiH mmol/g=8.8.

XL5: Branched silicone resin of formulae $M^HQ$ with $M^H=R_2HSiO_{1/2}$ and Q is a siloxy unit of formula $SiO_{4/2}$, formulas where H is a hydrogen atom and where R is methyl, total SiH mmol/g=9.7 (reference SiVance MQH-9 MQ Hydride Resin from Milliken).

XL6: Branched silicone resin of formulae: $(M^H)_3(T^{Ph})$ with $M=R_2HSiO_{1/2}$ siloxy unit and $T^{Ph}=PhSiO_{3/2}$, formulas where H is a hydrogen atom, R is methyl and Ph is phenyl, from Gelest reference SIP6826.0, phenyltris (dimethylhydrosiloxy)silane, total SiH mmol/g=5.2.

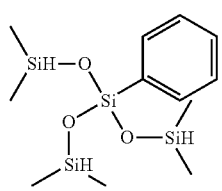

XL6

XL7: Branched silicone resin of formulae $M^HQ$ with $M^H=R_2HSiO_{1/2}$ and Q is a siloxy unit of formula $SiO_{4/2}$, formulas where H is a hydrogen atom and where R is methyl, total SiH mmol/g=6.7, from Gelest reference SIT7278.0, total SiH mmol/g=6.7.

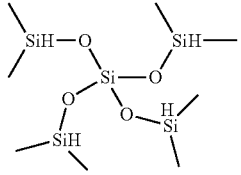

XL7

In another preferred embodiment, the crosslinkers XL according to the invention is a mixture containing:

a) at least one branched silicone resin comprising at least two, and preferably at least three, NAH siloxy units of formula $R_2HSiO_{1/2}$ and $T^{Ph}$ siloxy unit of formula $(Ph)SiO_{3/2}$, formulas where Ph is a phenyl group, H is a hydrogen atom and where R is a one to forty carbon atom monovalent hydrocarbon radical, preferably a one to twenty carbon monovalent hydrocarbon radical, more preferably selected from the group consisting of methyl, ethyl, propyl, iso-propyl, n-butyl, iso-butyl, sec-butyl, tert-butyl, pentyl, hexyl, heptyl, phenyl, benzyl, and mesityl; and most preferably selected from the group consisting of methyl and phenyl, and b) at least one linear organopolysiloxane B containing at least 3 silicon-bonded hydrogen atoms per molecule and/or a branched $M^HQ$ silicone resin comprising at least two, and preferably at least three, $M^H$ siloxy units of formula $R_2HSiO_{1/2}$ and Q siloxy unit of formula $SiO_{4/2}$, formulas where H is a hydrogen atom and where R is a one to forty carbon atom monovalent hydrocarbon radical, preferably a one to twenty carbon monovalent hydrocarbon radical, more preferably selected from the group consisting of methyl, ethyl, propyl, iso-propyl, n-butyl, iso-butyl, sec-butyl, tert-butyl, pentyl, hexyl, heptyl, phenyl, benzyl, and mesityl; and most preferably selected from the group consisting of methyl and phenyl.

In another preferred embodiment, in step d) the quantity of the crosslinker XL added is controlled and maintain within the range of 0.1 to 5.0%, preferably from 0.1 to 3.5% by weight percent, based on the weight of the crosslinkable liquid silicone rubber composition A3. The crosslinker XL is used in said amounts sufficient to cure the composition, preferably in a quantity that provides from about 1.0 to about 10 silicon-bonded hydrogen atoms per alkenyl group in the alkenyl-containing organopolysiloxane A.

In another preferred embodiment, in step g) the curing temperature is of from 80 to 140° C. and preferably is of from 90 to 130° C.

In another preferred embodiment, in step g) the curing temperature is of from 80 to 140° C. and preferably is of from 90 to 130° C.; and said crosslinkable liquid silicone rubber composition A3 is cured around or over a substrate P to form a composite part comprising said molded silicone rubber product M1.

The substrate P may be rigid or flexible. In a preferred embodiment the substrates P is selected from plastic substrates, thermoplastic substrates, metal substrates, and textile substrates.

Examples of plastic substrates and thermoplastic substrates (also organic resins) include acrylonitrile-butadiene-styrene, polyphenylene/styrene blends, polystyrenes, polycarbonate, polyurethane, styrene resin, polyethylene, polypropylene, acrylic, polyacrylamides, polyesters, polyethylene terephthalate, polybutylene terephthalate, polyphenylene oxide, polyphenylene sulfide, polysulfone, nylon, polyamide, polyimide, fluoropolymers, and liquid crystal resin and non-resin containing polyetherimides.

In a preferred embodiment, the substrate P is polyvinyl chloride (PVC), polyethylene (PE), polypropylene (PP), acrylonitrile butadiene styrene (ABS) and polycarbonate (PC).

Examples of metal substrates include metal substrates selected from copper, alclad aluminum, anodized aluminum, titanium, galvanized steel, cold-rolled steel, cast aluminum and cast magnesium.

Such composite parts include those constructions where any of a plastic substrate or thermoplastic substrate and a silicone elastomer are used as an integral component. Examples of such composite parts can be found in various industries including, but not limited to, automotive applications, medical applications, consumer and industrial applications and electronic applications.

Organopolysiloxane a Containing at Least 2 Alkenyl Groups Bonded to Silicon Atoms Per Molecule Organopolysiloxane A is a liquid polydiorganosiloxane containing at least two silicon-bonded alkenyl groups bonded to silicon atoms per molecule. Suitable alkenyl groups contain from 2 to 10 carbon atoms, and preferred examples are: vinyl, isopropenyl, allyl, and 5-hexenyl groups. The organopolysiloxane A comprises silicon-bonded organic groups other than alkenyl groups. Such silicon-bonded organic groups are typically selected from monovalent saturated hydrocarbon groups, which typically contain from 1 to 10 carbon atoms, and monovalent aromatic hydrocarbon groups, which typically contain from 6 to 12 carbon atoms, which are unsubstituted or substituted with groups that do not interfere with curing such as halogen atoms. Preferred silicon-bonded organic groups are, for example, alkyl groups such as methyl, ethyl, and propyl; halogenated alkyl groups such as 3,3,3-trifluoropropyl; and aryl groups such as phenyl.

Examples of suitable organopolysiloxane A according to the invention are polymers of the following formula (1):

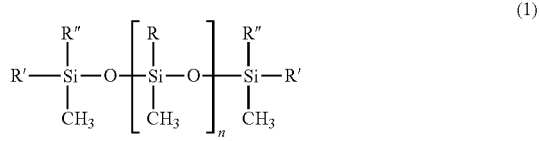

Formula in which: R and R", are chosen independently of one another and are monovalent saturated hydrocarbon radicals, which typically contain from 1 to 10 carbon atoms, or monovalent aromatic hydrocarbon radicals, which typically contain from 6 to 12 carbon atoms, which are unsubstituted or substituted with groups that do not interfere with curing reaction, such as halogen atoms. Preferred species of the silicon-bonded organic groups are, for example, alkyl groups such as methyl, ethyl, and propyl; halogenated alkyl groups such as 3,3,3-trifluoropropyl; and aryl groups such as phenyl. R' are alkenyl groups each containing from 2 to 14 carbon atoms, preferably said alkenyl groups are chosen from the group consisting of vinyl, allyl, hexenyl, decenyl and tetradecenyl, and most preferably said alkenyl groups are vinyl groups, and most preferably R' is a vinyl radical and n represents a degree of polymerization and it should be sufficient so that it achieves a viscosity of at least 100 mPa·s at 25° C. The upper limit for the degree of polymerization is not specifically restricted and is typically limited only by the processability of the LSR composition of the present invention.

All the viscosities under consideration in the present specification correspond to a dynamic viscosity magnitude that is measured, in a manner known per se, at 25° C., using a Rotational rheometer, Anton-Paar M302. As regards to fluid products, the viscosity under consideration in the present specification is the dynamic viscosity at 25° C., known as the "Newtonian" viscosity, i.e. the dynamic viscosity that is measured, in a manner known per se, at a sufficiently low shear rate gradient so that the viscosity measured is independent of the rate gradient.

As other examples of organopolysiloxane A that are of use, mention may be made of: Other examples of suitable organopolysiloxane A include trimethylsiloxy-endblocked dimethylsiloxane-methylvinylsiloxane copolymers; trimethylsiloxy-endblocked methylvinylsiloxane-methylphenylsiloxane copolymers; trimethylsiloxy-endblocked dimethylsiloxane-methylvinylsiloxane-methylphenylsiloxane copolymers; dimethylvinylsiloxy-endblocked dimethylpolysiloxanes; dimethylvinylsiloxy-endblocked methylvinylpolysiloxanes; dimethylvinylsiloxy-endblocked methylvinylphenylsiloxanes; dimethylvinylsiloxy-endblocked dimethylvinylsiloxane-methylvinylsiloxane copolymers; dimethylvinylsiloxy-endblocked dimethylsiloxane-methylphenylsiloxane copolymers; dimethylvinylsiloxy-endblocked dimethylsiloxane-diphenylsiloxane copolymers; and mixtures comprising at least one of the preceding organopolysiloxanes.

In a preferred embodiment, organopolysiloxane A is chosen among the followings: dimethylvinylsiloxy-terminated polydimethylsiloxane, dimethylvinylsiloxy-terminated polymethyl-3,3,3-trifluoropropylslioxane, dimethylvinylsiloxy-terminated dimethylsiloxane-3,3,3-trifluoropropylmethylsiloxne copolymer, and dimethylvinylsiloxy-terminated dimethylsiloxane/methylphenylsiloxane copolymer.

Organopolysiloxane B Containing at Least 2 Silicon-Bonded Hydrogen Atoms Per Molecule Organopolysiloxane B is an optional component that may be present and contains at least 2 silicon-bonded hydrogen atoms, and preferably at least 3 silicon-bonded hydrogen atoms. Such component may act as a cross-linker for organopolysiloxane A when it contains 3 silicon-bonded hydrogen atoms. The molecular structure of organopolysiloxane B is not specifically restricted, and it can be straight chain, branch-containing polymer, or cyclic. While the molecular weight of this ingredient is not specifically restricted, the viscosity is typically from 0.001 to 100 Pa·s at 25° C., preferably from 0.001 to 1 Pa·s. at 25° C. in order to obtain a good miscibility with other ingredients.

Examples of suitable organopolysiloxane B include but are not limited to: trimethylsiloxy-endblocked methylhydrogenpolysiloxanes; trimethylsiloxy-endblocked dimethylsiloxane-methylhydrogensiloxane copolymers; trimethylsiloxy-endblocked methylhydrogensiloxane-methylphenylsiloxane copolymers; trimethylsiloxy-endblocked dimethylsiloxane-methylhydrogensiloxane-methylphenylsiloxane copolymers; dimethylhydrogensiloxy-endblocked dimethylpolysiloxanes; dimethylhydrogensiloxy-endblocked methylhydrogenpolysiloxanes; dimethylhydrogensiloxy-endblocked dimethylsiloxanes-methylhydrogensiloxane copolymers; dimethylhydrogensiloxy-endblocked dimethylsiloxane-methylphenylsiloxane copolymers; dimethylhydrogensiloxy-endblocked methylphenylpolysiloxanes, silicone resins $M^HQ$ comprising: $(H)(CH_3)_2SiO_{1/2}$ units ($M^H$ unit) and $SiO_{4/2}$ units (Q units) and silicone resins $MM^HQ$ comprising: $(CH_3)_3SiO_{1/2}$ units (M units), $(CH_3)_2HSiO_{1/2}$ units ($M^{H\ units}$) and $SiO_{4/2}$ units.

In a preferred embodiment, the quantity of the components of the crosslinkable liquid silicone rubber composition A3 are chosen so as the value of the ratio RHalk=nH/tAlk is from 1.1 to 3.5, with nH=number of moles of hydrogen atom directly bonded to a silicon atom of said liquid silicone rubber composition A3 and tAlk=number of moles of alkenyl groups directly bonded to a silicon atom of said liquid silicone rubber composition A3.

Filler C

To achieve high level of physical properties, a reinforcing filler such as finely divided silica and other reinforcing fillers are often treated with one or more known filler treating agents to prevent a phenomenon referred to as "creping" or "crepe hardening" during processing of the curable composition.

Typically, the filler is surface treated using for example a fatty acid or a fatty acid ester such as a stearate, or with organosilanes, polydiorganosiloxanes, or organosilazanes hexaalkyl disilazane or short chain siloxane diols to render the filler(s) hydrophobic and therefore easier to handle and obtain a homogeneous mixture with the other ingredients.

Colloidal silicas are particularly preferred because of their relatively high surface area, which is typically at least 50 $m^2$ per gram. Colloidal silicas may be provided either as fumed silica or as a precipitated silica that may have been surfaced treated. In one method of surface treatment, the fumed silica or precipitated silica is exposed to cyclic organopolysiloxanes under heat and pressure. An additional method of treating fillers is one in which the silica is exposed to siloxanes or silanes in the presence of an amine compound.

Another method of surface treating silica filler employs methyl silane or silazane surface treating agents. Methylsilane or silazane surface treated fumed or precipitated silica fillers exhibit the property of producing pumpable silicone compounds but do not overly increase the low viscosity of the uncured liquid precursor silicone composition. After curing, silazane treated silicas impart an improved tear strength to the cured elastomer. U.S. Pat. Nos. 3,365,743 and 3,847,848 disclose such methods.

More preferred silica fillers are in situ formed fumed silica with a surface area between about 50 $m^2$ per gram to about 600 $m^2$ per gram, and most preferably between about 100 $m^2$ per gram to about 400 $m^2$ per gram measured in accordance with the Brunauer-Emmett-Teller (BET) method. In situ treated fumed silica occurs when the silanols on the surface of the fumed silica are capped with a silicon atom containing alkyl, aryl, or alkenyl pendant groups while being compounded with the polymer in the mixer. This process can utilize hexamethyldisilazane, tetramethyldivinyldisilazane or a suitable silanol capping agent known in the art, such as trimethylsilanol and dimethylvinylsilanol to treat the filler.

The amount of finely divided silica or other reinforcing filler used in the curable LSR composition of the present invention is at least in part determined by the physical properties desired in the cured elastomer. The curable LSR composition of the present invention typically comprises from 5 to 100 parts, typically from 10 to 60 parts by weight of a reinforcing filler for every 100 parts of organopolysiloxane A.

Another example of a suitable filler is hydrophobic silica aerogel which is a nanostructured material with high specific surface area, high porosity, low density, low dielectric constant and excellent heat insulation properties. Silica aerogels are synthesized either via supercritical drying process or via ambient pressure drying technique so as to obtain porous structure. It is now widely commercially available.

Hydrophobic silica aerogel is characterized by a surface area ranging of from 500 to 1500 $m^2/g$, alternatively of from 500 to 1200 $m^2/g$, in each case determined via the BET method. The hydrophobic silica aerogel may further be characterized by its porosity above 80%, alternatively above 90%. Hydrophobic silica aerogel may have an average particle size ranging from 5 to 1000 μm, alternatively of from 5 to 100 μm, alternatively of from 5 to 25 μm as measured by means of laser light scattering. An example of hydrophobic silica aerogel is a trimethyl silylated aerogel. The hydrophobic silica aerogel maybe presents in the curable liquid silicone rubber composition in an amount of from 1 to 30% weight relative to the total weight of the curable liquid silicone rubber.

Platinum Based Catalyst D

Examples of suitable catalysts include hydrosilylation catalysts such as Karstedt's catalyst shown in U.S. Pat. No. 3,715,334 or other platinum known to those in the art, and also including microencapsulated hydrosilylation catalysts for example those known in the art such as seen in U.S. Pat. No. 5,009,957. The catalyst may optionally be combined with an inert or active support. Examples of preferred catalysts which can be used include platinum type catalysts such as chloroplatinic acid, alcohol solutions of chloroplatinic acid, complexes of platinum and olefins, complexes of platinum and 1,3-divinyl-1,1,3,3-tetramethyldisiloxane (known as Karstedt catalyst) and powders on which platinum is supported, etc. The platinum catalysts are fully described in the literature. In particular, mention may in particular be made of the complexes of platinum and of an organic product described in U.S. Pat. Nos. 3,159,601, 3,159,602 and 3,220,972 and European Patents EP-A-057, 459, EP-188,978 and EP-A-190,530 and the complexes of platinum and of vinylated organopolysiloxane described in U.S. Pat. Nos. 3,419,593, 3,715,334, 3,377,432, 3,814,730, and 3,775,452.

Inhibitor for Hydrosilylation Vulcanizing Reactions E

The Inhibitors for hydrosilylation reactions are designed to slow the curing reaction and are also known as cure rate controllers. Cure rate controllers are well known in the art and examples of such materials can be found in U.S. Pat. No. 3,923,705 refers to the use of vinyl contained cyclic siloxanes. U.S. Pat. No. 3,445,420 describes the use of acetylenic alcohols. U.S. Pat. No. 3,188,299 shows the effectiveness of heterocyclic amines. U.S. Pat. No. 4,256,870 describes alkyl maleates used to control cure. Olefinic siloxanes can also be used as described in U.S. Pat. No. 3,989,667. Polydiorganosiloxanes containing vinyl radicals have also been used and this art can be seen in U.S. Pat. Nos. 3,498,945, 4,256,870, and 4,347,346. Preferred inhibitors for this composition are 1,3,5,7-tetramethyl-1,3,5,7-tetravinyl-cyclotetrasiloxane; 3-methyl-1-butyn-3-ol, 2-methyl-3-butyn-2-ol, 3-butyn-1-ol, 3-butyn-2-ol, propargylalcohol, 2-phenyl-2-propyn-1-ol, 3,5-dimethyl-1-hexyn-3-ol, 1-ethynylcyclopentanol, 1-phenyl-2-propynol, 3-methyl-1-penten- 4-yn-3-ol, 1-ethynyl-1-cyclohexanol (ECH) and mixtures thereof, with the most preferred being the 1-ethynyl-1-cyclohexanol (ECH).

Additional suitable inhibitor classes include hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated ene-ynes, hydroperoxides, nitriles and diaziridines.

In a preferred embodiment of the invention, the inhibitor E for hydrosilylation vulcanizing reaction is selected from the group consisting of 1-ethynyl-1-cyclohexanol, 2-methyl-3-butyn-2-ol, 3-butyn-1-ol, 3-butyn-2-ol, propargylalcohol, 2-phenyl-2-propyn-1-ol, 3,5-dimethyl-1-hexyn-3-ol, 1-ethynylcyclopentanol, 1-phenyl-2-propynol, 3-methyl-1-penten-4-yn-3-ol, and mixtures thereof.

To obtain a longer working time or "pot life" of the crosslinkable liquid silicone rubber composition A3, for example in the mixing tank 18, the quantity of the inhibitor for hydrosilylation vulcanization reactions E is adjusted precisely through the feed line hose (12) to reach the desired "pot life". If present in the silicone rubber base compositions A1 and A2, the concentration of the added catalyst inhibitor is kept very low and its concentration will vary widely depending on the particular inhibitor used, and the nature of the organohydrogenopolysiloxane.

Additive F

Typical additives useful for the invention include additive color masterbatches, UV light stabilizers, wetting agent, compression set additive, plasticizer, self-bonding additives, anti-microbial additives, heat stabilizers, flame retardants, adhesion promoters, electrically conductive fillers, thermally conductive fillers, non-conductive fillers, lubricants, antistatic additives, low compression set additives, durometer adjustment additives, low coefficient of friction additives (such as tung oil), oil resistance additives, anti-crepe hardening additives, mold release additives, plasticizers, thickening or consistency increase additives, chain extenders, blowing agents, and combinations thereof.

If the additive is not in a liquid form, it may be combined with a silicone diluent such as polydimethylsiloxane and/or organopolysiloxane A so that it can be added either directly into the silicone rubber base compositions A1 and A2 or into the crosslinkable liquid silicone rubber composition A3, for example in the mixing tank 18, through the feed line hose (38).

Any pigments and dyes, which are applicable to silicone elastomers but do not inhibit the hydrosilylation catalyzed addition reaction, can be employed in this invention. In a preferred embodiment of the invention, the pigments and dyes are used in the form of a pigment master batch composed of pigment dispersed in polydiorganosiloxanes. Examples of additives include pigments such as carbon black, iron oxides, titanium dioxide, chromium oxide, bismuth vanadium oxide and mixtures or derivatives thereof. By "pigment" it is meant a colored, black, white or fluorescent particulate organic or inorganic solids which usually are insoluble in, and essentially physically and chemically unaffected by, the vehicle or substrate in which they are incorporated. It alters appearance by selective absorption and/or by scattering of light. A pigment generally retains a crystal or particulate structure throughout the coloration process. It also includes coloring agents such as vat dyes, reactive dyes, acid dyes, chrome dyes, disperse dyes, cationic dyes and mixtures thereof. By "dye" it is meant a colored or fluorescent organic substance only, which impart color to a substrate by selective absorption of light. Pigments and dyes are well known in the art and need not be described in detail herein.

Examples of electrically conductive fillers include, without limitation, carbon, such as graphite, carbon black, vapor grown carbon fibers, and carbon nanotubes; and conductive metals. Particulate and micro particulate conductive materials that create electrical conductivity in the cured silicone are exemplified by powders and micro powders of gold, silver, nickel, copper, and the like, as well as alloys containing at least one of the foregoing metals; and by the powders and micro powders fabricated by the vacuum deposition, or plating, of a metal such as gold, silver, nickel, copper, and their alloys, and the like, onto the surface of a ceramic, glass, quartz, or organic resin micropowder, and the like. Examples of fillers that fit the above descriptions are silver, silver-coated aluminum, silver-coated copper, silver-coated solid and hollow glass, silver-coated ceramic, silver-plated nickel, nickel, nickel-coated graphite, carbon, and the like.

Examples of heat stabilizers include iron oxides and carbon blacks, Iron carboxylate salts, cerium hydrate, titanium dioxide, barium zirconate, cerium and zirconium octoates, and porphyrins.

Flame retardants may include for example, carbon black, hydrated aluminum hydroxide, magnesium hydroxide, huntite/hydromagnesite blends, zinc borate and silicates such as wollastonite, platinum and platinum compounds and mixtures or derivatives thereof. Aluminium trihydrate (ATH) is a common flame retardant. It decomposes when heated above 180-200° C. at which point it absorbs heat and releases water to quench the flame. Magnesium hydroxide (MDH) has a higher thermal stability than ATH. Endothermic (heat absorbing) decomposition starts at 300° C. whereupon water is released which could act as a fire retardant. Huntite/Hydromagnesite blends ($Mg_3Ca(CO_3)_4/Mg_5(CO_3)_4(OH)_2.4H_2O$). Huntite and hydromagnesite occur, almost invariably, as mixtures in nature. The hydromagnesite starts to decompose between 220° C. (open air) and 250° C. (under pressure in an extruder), which is high enough so that it can be used as a flame retardant. The hydromagnesite gives off water and absorbs heat, much like ATH and MDH do. In contrast, the huntite decomposes above 400° C., absorbing heat but liberating carbon dioxide.

Examples of non-conductive fillers include quartz powder, diatomaceous earth, talc, clay, alumina, mica, calcium carbonate, magnesium carbonate, hollow glass and in particular hollow glass beads such as hollow borosilicate glass microspheres also known as glass bubbles or glass microbubbles, glass fiber, hollow resin and plated powder, and mixtures or derivatives thereof.

Examples of chain extenders include a disiloxane or a low molecular weight polyorganosiloxane containing two silicon-bonded hydrogen atoms at the terminal positions such as tetramethyldihydrogendisiloxane or dimethylhydrogen-terminated polydimethylsiloxane.

Examples of adhesion promoters include zirconium chelates and silanes such as 3-glycidoxypropyl trimethoxysilane, 3-glycidoxypropyl triethoxysilane, 3-glycidoxypropyl methyldimethoxysilane, 4-glycidoxybutyl trimethoxysilane, 5,6-epoxyhexyl triethoxysilane, 2-(3,4-epoxycyclohexyl) ethyltrimethoxysilane, 2-(3,4-epoxycyclohexyl) ethyltriethoxysilane, methacryloxymethyl-trimethoxysilane, 3-methacryloxypropyl-tirmethoxysilane, 3-methacryloxypropyl-methyldimethoxysilane, 3-methacryloxypropyl-dimethylmethoxysilane, 3-methacryloxypropyl-triethoxysilane, 3-methacryloxypropyl-methyldiethoxysilane, 3-methacryloxyisobutyl-trimethoxysilane, 3-acryloxypropyl-trimethoxysilane, 3-acryloxypropyl-methyldimethoxysilane, 3-acryloxypropyl-dimethyl-methoxysilane and 3-acryloxypropyl-triethoxysilane, and mixtures thereof.

Examples of suitable blowing agents include any liquids or solids that generate gas by chemical decomposition or evaporation which are well known by the man of the art. Preferably said blowing agent is a chemical blowing agent, and most preferably said blowing agent is chosen from the group consisting of ammonium bicarbonate, ammonium hydrogen carbonate, alkali metal hydrogen carbonate and mixtures thereof.

The invention also concerns a device assembly useful for producing a molded silicone rubber product via injection molding as described above comprising:

1) a dosing system (2) that conveys liquids and includes a platform (1) or a pallet (1'),
2) a first supply container (3), and optionally a second supply container (4), both placed on said standing platform (1) or on said pallet (1'), and containing respectively a liquid silicone rubber base composition A1 and A2 which do not contain a catalyst, and which comprise:
   at least one organopolysiloxane A containing at least 2 alkenyl groups bonded to silicon atoms per molecule,
   optionally at least one organopolysiloxane B containing at least 2 silicon-bonded hydrogen atoms per molecule B; and preferably at least 3 silicon-bonded hydrogen atoms per molecule B,
   optionally, at least one filler C,
   optionally at least one inhibitor E for hydrosilylation vulcanizing reactions, and
   optionally at least one additive F,
3) follower plates (5) disposed on the surface of said liquid silicone rubber base compositions A1 and A2, and for which their sizes and shapes are chosen to closely seal said supply containers (3) and (4), and said follower plates (5) are maintained by vertically adjustable (6) holding devices,
4) pumps (7) which are connected to said follower plates (5) and which are driven by drive units (19) operated by a control unit (20) and optionally by regulating units (21) to transfer the liquid silicone rubber base composition A1, and optionally the silicone rubber base composition A2,
5) a first base feed line hose (8) for conveying said liquid silicone rubber base composition A1 which contains a flow control element (9) operated by said control unit (20),
6) optionally, a second base feed line hose (10) for conveying said liquid silicone rubber base composition A2 which contains a flow control element (11) operated by said control unit (20),
7) a supply container (30), containing a catalyst masterbatch C1 comprising at least one platinum-based catalyst D, linked to a feed line (12) which contains a flow control element (13), and optionally a sensor (22), both operated by said control unit (20),
8) a supply container (31), containing an inhibitor masterbatch E1 comprising at least one inhibitor E for hydrosilylation vulcanizing reaction, linked to a feed line (14) which contains a flow control element (15), and optionally a sensor (23), both operated by said control unit (20),
9) one of the supply containers (30) and (31) further contains at least one crosslinker XL which is an organopolysiloxane containing at least three silicon-bonded hydrogen atoms per molecule when it is a linear polymer or at least two silicon-bonded hydrogen atoms per molecule when it is a branched polymer, and which is linked to a feed line hose (16) which contains a flow control element (17), and optionally a sensor (24), both operated by said control unit (20),
10) optionally a supply container (37) containing at least one additive F linked to a feed line hose (38) which contains a flow control element (39), and optionally a sensor (40), both operated by said control unit (20),
11) optionally a mixing tank (18), which is preferably a static mixer (18'), in which said liquid silicone rubber base A1, said catalyst masterbatch C1, said inhibitor masterbatch E1, said crosslinker XL, optionally said liquid silicone rubber base A2 and said additives F are transferred and mixed so as to obtain a crosslinkable liquid silicone rubber composition A3 comprising:
   a) at least one organopolysiloxane A containing at least 2 alkenyl groups bonded to silicon atoms per molecule,
   b) optionally at least one organopolysiloxane B containing at least 2 silicon-bonded hydrogen atoms per molecule; and preferably at least 3 silicon-bonded hydrogen atoms per molecule B,
   c) optionally, at least one filler C,
   d) at least one platinum-based catalyst D,
   e) at least one inhibitor E for hydrosilyation vulcanizing reactions,
   f) at least one crosslinker XL which is an organopolysiloxane containing at least three silicon-bonded hydrogen atoms per molecule when it is a linear polymer or at least two silicon-bonded hydrogen atoms per molecule when it is a branched polymer, and
   g) optionally at least one additive F,
12) a control unit (20), optionally linked to a display unit (29), which controls said sensors (21), (22), (23), (24) and (40) and flow control elements (9), (13), (15), (17) and (39) to adjust the added amounts in said crosslinkable liquid silicone rubber composition A3 of said platinum-based catalyst D and of said inhibitor for hydrosilyation vulcanizing reactions E, and preferably said added amounts are adjusted so as to get a molar ratio of the inhibitor for hydrosilyation vulcanizing reactions E to platinum atom of the platinum-based catalyst D which ranges from 0.1 to 900 (0.1:1 to 900:1), most preferably from 10 to 900 (10:1 to 900:1), and even more preferably from 20 to 250 (20:1 to 250:1);
13) a barrel (25) which is part of an injection molding press (26) and into which is introduced:
   either said crosslinkable liquid silicone rubber composition A3 from said mixing tank (18) or,
   said liquid silicone rubber base A1, said catalyst masterbatch C1, said inhibitor masterbatch E1, said crosslinker XL, optionally said liquid silicone rubber base A2 and said additives F so as to obtain said crosslinkable liquid silicone rubber composition A3, and
14) a mold (27), which is installed in the molding press (26), and in which is transferred said crosslinkable liquid silicone rubber composition A3 so as to be cured, preferably by heating at a temperature ranging from 80° C. to up to 220° C., so as to obtain a molded silicone rubber product.

In a preferred embodiment, the invention also concerns a device assembly useful for producing a molded silicone rubber product via injection molding as described above and comprising:

1) a dosing system (2) that conveys liquids and includes a platform (1) or a pallet (1'),
2) a first supply container (3), and optionally a second supply container (4), both placed on said standing platform (1) or on said pallet (1'), and containing respectively a liquid silicone rubber base composition A1 and A2 which do not contain a catalyst, and which comprise:
   at least one organopolysiloxane A containing at least 2 alkenyl groups bonded to silicon atoms per molecule,
   optionally at least one organopolysiloxane B containing at least 2 silicon-bonded hydrogen atoms per molecule B; and preferably at least 3 silicon-bonded hydrogen atoms per molecule B,
   optionally, at least one filler C,
   optionally at least one inhibitor E for hydrosilylation vulcanizing reactions, and
   optionally at least one additive F,
3) follower plates (5) disposed on the surface of said liquid silicone rubber base compositions A1 and A2, and for which their sizes and shapes are chosen to closely seal said supply containers (3) and (4), and said follower plates (5) are maintained by vertically adjustable (6) holding devices,
4) pumps (7) which are connected to said follower plates (5) and which are driven by drive units (19) operated by a control unit (20) and optionally by regulating units (21) to transfer the liquid silicone rubber base composition A1, and optionally the silicone rubber base composition A2,
5) a first base feed line hose (8) for conveying said liquid silicone rubber base composition A1 which contains a flow control element (9) operated by said control unit (20),
6) optionally, a second base feed line hose (10) for conveying said liquid silicone rubber base composition A2 which contains a flow control element (11) operated by said control unit (20),
7) a supply container (30), containing a catalyst masterbatch C1 comprising at least one platinum-based catalyst D, linked to a feed line (12) which contains a flow control element (13), and optionally a sensor (22), both operated by said control unit (20),
8) a supply container (31), containing an inhibitor masterbatch E1 comprising at least one inhibitor E for hydrosilylation vulcanizing reaction, linked to a feed line (14) which contains a flow control element (15), and optionally a sensor (23), both operated by said control unit (20),
9) a supply container (32) containing at least one crosslinker XL which is an organopolysiloxane containing at least three silicon-bonded hydrogen atoms per molecule when it is a linear polymer or at least two silicon-bonded hydrogen atoms per molecule when it is a branched polymer, and which is linked to a feed line hose (16) which contains a flow control element (17), and optionally a sensor (24), both operated by said control unit (20),
10) optionally a supply container (37) containing at least one additive F linked to a feed line hose (38) which contains a flow control element (39), and optionally a sensor (40), both operated by said control unit (20),
11) optionally a mixing tank (18), which is preferably a static mixer (18'), in which said liquid silicone rubber base A1, said catalyst masterbatch C1, said inhibitor masterbatch E1, said crosslinker XL, optionally said liquid silicone rubber base A2 and said additives F are transferred and mixed so as to obtain a crosslinkable liquid silicone rubber composition A3 comprising:
   a) at least one organopolysiloxane A containing at least 2 alkenyl groups bonded to silicon atoms per molecule,
   b) optionally at least organopolysiloxane B containing at least 2 silicon-bonded hydrogen atoms per molecule; and preferably at least 3 silicon-bonded hydrogen atoms per molecule B,
   c) optionally, at least one filler C,
   d) at least one platinum-based catalyst D,
   e) at least one inhibitor E for hydrosilyation vulcanizing reactions,
   f) at least one crosslinker XL which is an organopolysiloxane containing at least three silicon-bonded hydrogen atoms per molecule when it is a linear polymer or at least two silicon-bonded hydrogen atoms per molecule when it is a branched polymer, and
   g) optionally at least one additive F, and
12) a control unit (20), optionally linked to a display unit (29), which controls said sensors (21), (22), (23), (24) and (40) and flow control elements (9), (13), (15), (17) and (39) to adjust the added amounts in said crosslinkable liquid silicone rubber composition A3 of said platinum-based catalyst D and of said inhibitor for hydrosilyation vulcanizing reactions E, and preferably said added amounts are adjusted so as to get a molar ratio of the inhibitor for hydrosilyation vulcanizing reactions E to platinum atom of the platinum-based catalyst D which ranges from 0.1 to 900 (0.1:1 to 900:1), most preferably from 10 to 900 (10:1 to 900:1), and even more preferably from 20 to 250 (20:1 to 250:1),
13) a barrel (25) which is part of an injection molding press (26) and into which is introduced:
   either said crosslinkable liquid silicone rubber composition A3 from said mixing tank (18) or,
   said liquid silicone rubber base A1, said catalyst masterbatch C1, said inhibitor masterbatch E1, said crosslinker XL, optionally said liquid silicone rubber base A2 and said additives F so as to obtain said crosslinkable liquid silicone rubber composition A3, and
14) a mold (27), which is installed in the molding press (26), and in which is transferred said crosslinkable liquid silicone rubber composition A3 so as to be cured, preferably by heating at a temperature ranging from 80° C. to up to 220° C., so as to obtain a molded silicone rubber product.

All the chemical components in the device assembly according to the invention are as described above.

The device assembly according to the invention allows to perform efficiently the method according to the invention.

Indeed, according to the invention, the device assembly uses a single container containing a LSR base composition which does not contain a catalyst, as the required amount of catalyst, of crosslinker and inhibitor are added on-site only and prior molding via a separate feed lines which contains a flow control element and optionally a sensor both operated by a control unit (20). This avoid problems linked to pre-curing during long storage of containers.

Another advantage linked to the use of the device assembly according to the invention, is that it is now possible just prior to mold injection to feed separately an inhibitor masterbatch E1, a crosslinker XL, a liquid silicone rubber base which does not contain a catalyst, a catalyst masterbatch C1 and an additive F into a mixer via distinct feed line hoses which are all operated by a single control unit (20) which allows for a perfect control of the whole process.

Furthermore, from said control unit (20), which is optionally linked to a display unit (29), it is now possible to easily adjust the added amounts of the crosslinker XL, of the platinum-based catalyst D and of the liquid injection molding inhibitor E into the silicone rubber base composition thus allowing for control of the cure speed of the crosslinkable liquid silicone rubber composition. By controlling the molar ratio of the injection molding inhibitor E to platinum atom of the platinum-based catalyst D in a working range for injection molding, the device assembly according to the invention offers more flexibility. The preferred working range of such ratio are from 0.1 to 900 (0.1:1 to 900:1), from 10 to 900 (10:1 to 900:1) and from 20 to 250 (20:1 to 250:1).

In a preferred embodiment, the control unit (20) is linked to a display unit (29) so that all the required information is visible for the operator who can modifying the conditions of the molding process and in particular the control of sensors (21), (22), (23), (24) and (40) and flow control elements (9), (13), (15), (17) and (39). The control unit may additionally or alternatively be adapted to monitor and identify deviations outside the pre-defined working range for addition of the crosslinker XL and for the molar ratio of the injection molding inhibitor E to platinum atom of the platinum-based catalyst D. The control unit may be designed to trigger an alarm/signal in response to the detection of such deviations to warn an operator of potential quality control issues. The control unit may also monitor flow rate of the materials being transported through the different feed lines to maintain a pre-determined minimum flow, to ensure optimum operational accuracy.

In another preferred embodiment a second supply container (4) containing the liquid silicone rubber base A2 is added to the device assembly allowing the use of a standard LSR mixing device configured for standard two-part LSR processes and therefore avoiding a need to set-up complex dosing systems. The use of a supply container (4) allows a continuous and automated production sequence giving flexibility to move away the empty container and replace it by a new filled container without stopping the molding sequence.

Furthermore, in another preferred embodiment, a pallet (1') is use so that no laborious transferring of containers to the device assembly is necessary as it can be easily moved using a stacker truck or similar equipment. For example, the pallet (1') on which the containers are supplied can be pushed directly into the device assembly. Multiple containers can be delivered to the device assembly in a single delivery operation. In another preferred embodiment, the pallet (1') is clean-room compatible and preferably consists of plastic, steel, galvanized steel or stainless steel. These materials are easy to clean and therefore compatible with a clean room.

In another preferred embodiment, said follower plates (5) contains at least one air purging valve (28) connected to a pressure sensor that can be operated by said control unit (20) as after having placed the follower plate on the liquid surface, the container may contain air, which has to be removed before starting to discharge material from the container, as the air contained in the liquid must not enter the production process, resulting in incorrect measurements.

In another preferred embodiment, said vertically adjustable (6) holding devices are pistons that drive the follower plates (5) down displacing the liquid silicone rubber base composition A1 and optionally the liquid silicone rubber base composition A2.

In another preferred embodiment, sensors may be arranged within said vertically adjustable holding device (6). The sensors measure the level in the container and are connected to a regulating unit, which, in turn, is connected to the pump which is used to empty the container. The arrangement of a sensor measuring the level within the container to control emptying via the regulating unit avoids residual liquid that may otherwise remain in a container, thus ensuring that the container is completely emptied.

In another preferred embodiment, said pump (7) is a dipper piston pump, a gear pump, an eccentric screw pump, an extrusion pump, a screw spindle pump or a scoop piston pump, and preferably said pump (7) is a screw spindle pump. A significant advantage of the screw spindle pump is its constant delivery pressure and its constant delivery volume providing an exact mixing ratio to be maintained at any point in time.

In another preferred embodiment, said pumps (7) are screw spindle pumps and are connected to the follower plates (5), the follower plate (5) being vertically adjustable and resting on the surface of the respective liquid and sealing the respective containers. An advantage of the screw spindle pump is its constant delivery pressure and its constant delivery volume.

In another aspect of this embodiment, said pump (7) is an extrusion pump which is driven pneumatically, hydraulically or electrically and operated by an electrical control unit (20).

In another preferred embodiment said flow control elements (9), (11), (13), (15), (17) and (39) are flow control valves.

In another preferred embodiment said supply containers (3) and (4) are drums having a volume of up to 500 liters, and preferably a volume of up to 250 liters.

In another preferred embodiment, said supply containers (30), (31) and (32), and optional container (37), are connected to airlines (36) which drive their contents into the mixing tank (18) or into the barrel (25) when the mixing tank (18) is not present.

In another embodiment, the sensors (21), (22), (23), (24) and (40) are flow sensors which may be volumeters, flow meters or differential pressure flow sensors. Various flow sensors are known in the art. Flow sensors are classified into volumeters (i.e., volumetric flow meters) and flow meters. Volumeters (i.e., volumetric flow meters) include direct meters (i.e., displacement meters), such as oval-wheel meters, oscillating piston meters, or rotary piston meters, and indirect meters, such as turbine wheel meters, impeller meters, hydrometric vanes, worm wheel meters, vortex-shedding meters, or spiral flow meters. Flow meters include volumetric flow meters, such as differential pressure measuring processes, rotameters, magnetic induction flow meters, or ultrasound flow meters, as well as mass flow meters, such as Coriolis mass flow meters or thermal mass flow meters. A differential pressure flow sensor measures the pressure before and after the flow control valve and deducts the flow rate from the pressure difference.

In another embodiment, said mold (27) includes at least two corresponding parts which can be moved between an opened position and a closed position and which form at least one mold cavity when it is in a closed position.

In another embodiment, the liquid silicone rubber injection molding device assembly further comprising a cold-runner system (34) connected to said mold (27). It keeps the crosslinkable liquid silicone rubber composition A3 cold until it is injected into the hot cavities of the mold (27), hence reducing potential waste.

Referring to FIG. 1, a dosing system (2) according to the invention that conveys the LSR material and includes a platform (1) for the drum (3) containing a liquid silicone rubber base composition A1 which does not contain a catalyst, and which comprises:
- at least one organopolysiloxane A containing at least 2 alkenyl groups bonded to silicon atoms per molecule,
- optionally at least one organopolysiloxane B containing at least 2 silicon-bonded hydrogen atoms per molecule B; and preferably at least 3 silicon-bonded hydrogen atoms per molecule B,
- optionally, at least one filler C,
- optionally at least one liquid injection molding inhibitor E, and
- optionally at least one additive F.

A rolling-in device (33) (not drawn) for moving the dosing system (2), the standing platform (1) or the pallet (1') may be provided to allow displacement without great effort. A follower plate (5) is disposed on the surface of said liquid silicone rubber base compositions A1, and for which its size and shape is chosen so as to closely seal said supply container (3). Said follower plate (5) is maintained by a vertically adjustable holding device (6) which is capable of moving the follower plate (5) up and down. The holding device (6) is preferably a piston that drives the follower plate (5) down displacing the liquid silicone rubber base composition A1. The follower plate (5) may have different diameters and is adapted to the supply container (3) to be emptied. When the follower plate (5) is placed on the supply containers (3), it is preferable that air must be able to escape, which is ensured by the air purging valve (28) that can be operated by said control unit (20).

In most cases, the supply container (3) is a drum. A static seal may serve the purpose of sealing the container. It is possible to use an inflatable seal for 20- and 200-liter-drum. This makes it possible to process a drum with minor defects. The follower plates (5) may be light constructions (e.g., weight below 15 kg, such that occupational health and safety provisions allow for an exchange by the operating staff). The materials of supply container (3) is pumped by feeding pumps (7), such as a dipper piston pump, a gear pump, an eccentric screw pump, an extrusion pump, a screw spindle pump, a scoop piston pump or any other pump. Said pump (7) may be driven by drive unit (19) (not represented) operated by a control unit (20) and optionally by a regulating unit (21). It allows transfer, via a feed line hose (8) which contains a flow control element (9) operated by said control unit (20), the liquid silicone rubber base composition A1 either into a mixing tank (18) (option chosen for this drawing), which is preferably a static mixer (18'), or directly into the barrel (25) which is part of an injection molding press (26) (this option is not drawn).

A supply container (30), containing a catalyst masterbatch C1 comprising at least one platinum-based catalyst D, is linked to a feed line (12) which contains a flow control element (13), and optionally a sensor (22), both operated by said control unit (20). It allows transfer of its content either into the mixing tank (18) (option chosen for this drawing) or directly into the barrel (25) (this option is not drawn).

A supply container (31), containing an inhibitor masterbatch E1 comprising at least one liquid injection molding inhibitor E is linked to a feed line hose (14) which contains a flow control element (15), and optionally a sensor (23), both operated by said control unit (20). It allows transfer of its content either into the mixing tank (18) (option chosen for this drawing) or directly into barrel (25) (this option is not drawn). The mixing tank (18) is preferably a static mixing device.

A supply container (32) containing at least one crosslinker XL is linked to a feed line (16) which contains a flow control element (17), and optionally a sensor (24), both operated by said control unit (20). It allows transfer of its content either into the mixing tank (18) (option chosen for this drawing) or directly into the barrel (25) (this option is not drawn).

In the mixing tank (18), when it is present, and in the barrel (25) is obtained a crosslinkable liquid silicone rubber composition A3 comprising:
- a) at least one organopolysiloxane A containing at least 2 alkenyl groups bonded to silicon atoms per molecule,
- b) optionally at least one organopolysiloxane B containing at least 2 silicon-bonded hydrogen atoms per molecule; and preferably at least 3 silicon-bonded hydrogen atoms per molecule B,
- c) optionally, at least one filler C,
- d) at least one platinum-based catalyst D,
- e) at least one inhibitor E for hydrosilyation vulcanizing reactions,
- f) at least one crosslinker XL which is an organopolysiloxane containing at least three silicon-bonded hydrogen atoms per molecule when it is a linear polymer or at least two silicon-bonded hydrogen atoms per molecule when it is a branched polymer, and
- g) optionally at least one additive F.

A control unit (20), optionally linked to a display unit (29) (option chosen for this drawing), operates sensors (21), (22), (23), (24) and (40) and flow control elements (9), (13), (15), (17) and (39) so as to adjust the added amounts in said crosslinkable liquid silicone rubber composition A3 of said platinum-based catalyst D and of said liquid injection molding inhibitor E. Said added amounts are adjusted so as to maintain a molar ratio of the injection molding inhibitor E to platinum atom of the platinum-based catalyst D in the range of 0.1 to 900 (0.1:1 to 900:1), and most preferably in the range of from 10 to 900 (10:1 to 900:1). In a preferred embodiment, in step d) the quantity of the crosslinker XL added is controlled and maintain within the range of 0.1 to 3.5% by weight percent, based on the weight of the crosslinkable liquid silicone rubber composition A3.

A barrel (25) which is part of an injection molding press (26) and into which is introduced:
- either said crosslinkable liquid silicone rubber composition A3 from said mixing tank (18), or
- said liquid silicone rubber base A1, said crosslinker XL, said catalyst masterbatch C1, said inhibitor masterbatch E1 comprising the inhibitor for hydrosilylation vulcanizing reactions E, optionally said liquid silicone rubber base A2 and said additives F so as to obtain said crosslinkable liquid silicone rubber composition A3.

Pressure regulation may be required before the crosslinkable LSR composition A3 enters the injection unit. This device (not shown in the drawing) allows for a restriction in the fluid path that can increase pressure, which allows for proper shot dosing. Pressure regulators are adjustable, but typically kept in the 0.7-3.5 MPa (100-500 psi) range to prevent over-compression of the metered shot.

To prevent premature crosslinking, or curing, during dosing and injection, the injection unit barrel maybe water cooled. This limits the effect of viscous heating that occurs between the crosslinkable LSR composition A3, the screw, and the barrel.

A screw tip with a positive shutoff (not shown in the drawing), or non-return valve may also be used such as ball-check valve which has either a spring-loaded or floating ball that is in the closed position during injection, but open during shot dosing.

A shutoff nozzle is preferably used which is water cooled to prevent premature crosslinking during injection and dosing prior to introducing the crosslinkable liquid silicone rubber composition A3 into the mold (27) and prevents the backflow during part curing. Within the nozzle the material is diverted around a piston that drives the shutoff needle and reintroduced to the flow path near the nozzle tip. A cold-runner system (34) may also connected to said mold (27).

Once filling of mold (27) is complete with the crosslinkable LSR composition A3, packing pressure is kept on the material until curing occurs at temperatures ranging from 80° C. to 220° C. and if needed can be lowered to temperature ranges from 80° C. to 220° C., from 80° C. to 160° C., from 80° C. to 140° C., from 80° C. to below 120° C., from 80° C. to below 110° C. or from 80° C. to below 100° C. without deteriorating the optimum cure speed of the LSR material.

A cure time follows injection and packing and is dependent on part geometry: Longer time for thicker parts and shorter for thinner parts.

When curing is complete, the mold (27) opens, allowing for part demolding and continuation to the next shot.

Figure 2:
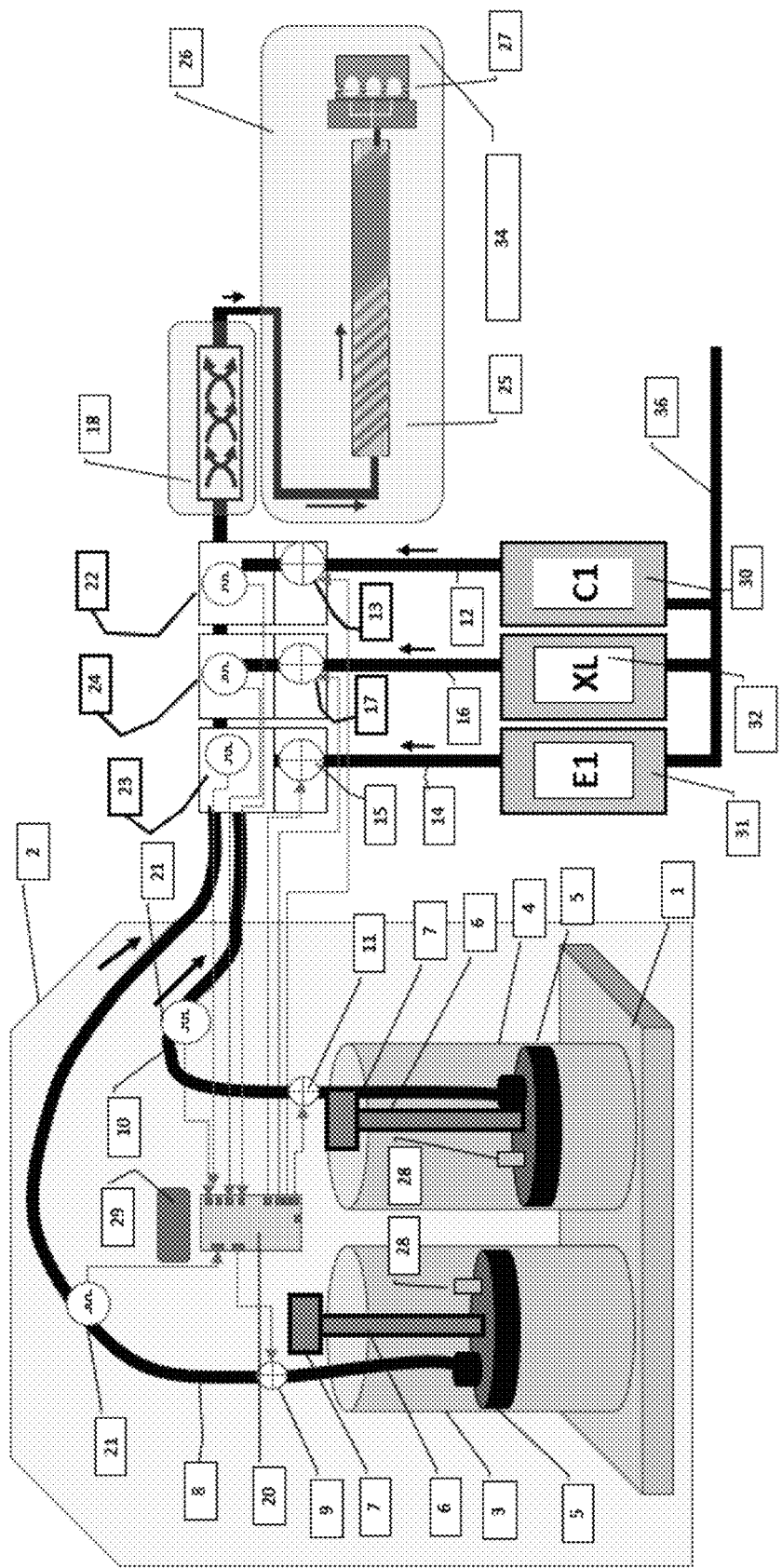
FIG. 2 is an embodiment of the invention and is a schematic representation of a device assembly useful for producing a molded silicone rubber product via a method according to the invention and via injection molding. The inhibitor masterbatch E1 (31), the catalyst masterbatch C1 (30) and the crosslinker XL (32) are separate from two liquid silicone rubber bases A1 and A2 which do not contain a catalyst and are fed into a mixing tank (18), which is preferably a static mixer (18), prior to their introduction into the barrel (25) of the injection molding press. The silicone rubber bases A1 (3) and A2 (4) could have similar composition to allow continuous process or of different compositions to give a wider flexibility in terms of a wider range of Shore A durometer of the final molded silicone product. In this Figure, the optional presence of an additive separate feed line and container is not represented.

Referring to FIG. 2 a dosing system (2) according to the invention which is another embodiment. The only difference with FIG. 1 is the addition of a second supply container (4), containing a liquid silicone rubber base composition A2 which does not contain a catalyst, and which comprises:
at least one organopolysiloxane A containing at least 2 alkenyl groups bonded to silicon atoms per molecule;
optionally at least one organopolysiloxane B containing at least 2 silicon-bonded hydrogen atoms per molecule B; and preferably at least 3 silicon-bonded hydrogen atoms per molecule B;
optionally, at least one filler C,
optionally at least inhibitor for hydrosilylation vulcanizing reactions E, and
optionally at least one additive F.

This second supply container (4) may be used just after the first supply container (3) is emptied thus allowing a continuous process to optimize the production cycle time. Or it can be used with the first supply container (3) for example to allow for the use of two different LSR bases with different durometers properties (different content of fillers and other components) allowing more additional flexibility for the manufacturing of different types of silicone rubber materials.

EXAMPLES

Figure 3:
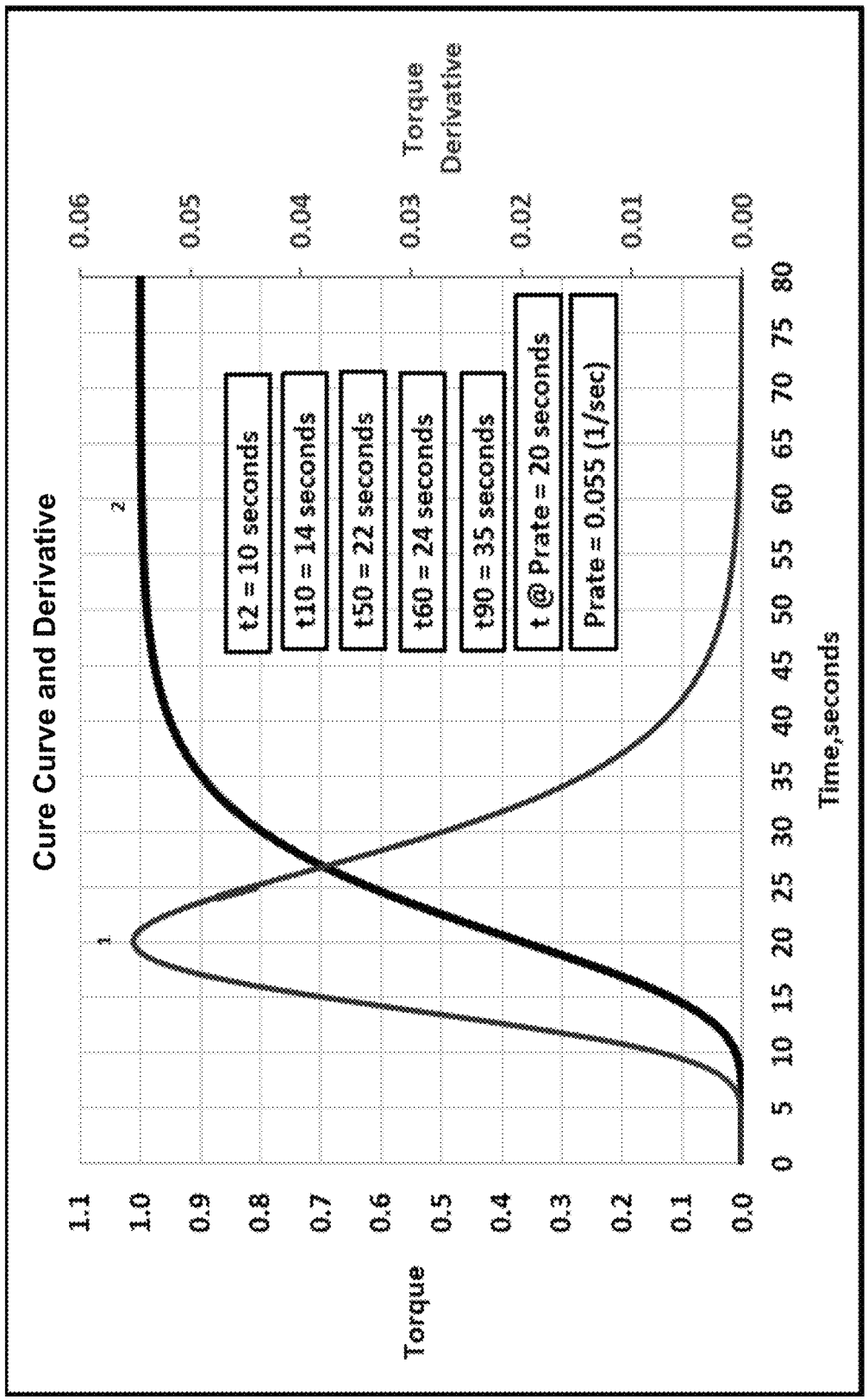
FIG. 3 shows a cure curve or torque curve (labelled 2), which is torque versus time.

Cure was monitored on a Moving Die Rheometer (MDR) using ASTM-D5289, at 110° C. for 5 minutes. Approximately 5 g of material was placed between two thin sheets of nylon at room temperature and then compressed by an applied oscillation force between two heated platens. One platen or die oscillates rotationally while the other is attached to a torque transducer. Initially, with the unvulcanized (uncured) rubber specimen, very little or no torque from the moving die is coupled to the transducer. As the compound is heated under pressure, the viscosity drops, and the torque exerted on the rotor decreases. The lowest torque value recorded, measured in dN*m, is called ML (Moment Lowest). It is a measurement of the stiffness of the uncured rubber compound at a given temperature. As the rubber cures or vulcanizes, it becomes increasingly elastic. The rubber becomes increasing effective at coupling the torque to the transducer. The torque is a parameter of the extent of vulcanization or cure of the rubber. A sigmoidal curve can approximate an actual cure curve. As shown below, the black curve (labelled 2) is the cure curve or torque curve, which is torque versus time. The torque begins at a minimal value. Torque increases slowly at first, then increases rapidly. Finally, the cure curve levels and becomes approximately constant. In FIG. 3, the maximum torque is set at a value of 1 unit. Vulcanization proceeds from the minimum (which may not be exactly zero) to the maximum torque. Among the statistics derived are the various times at which points of interest are reached. These are t2 (2% cure), t10 (10% cure) etc. t90 (90% cure) is usually also of great interest.

The curve labelled 1 in FIG. 3 is the derivative curve, or the slope of the cure curve. The derivative can be used to determine the maximum rate of cure and the time at which that maximum is achieved. These statistics are Prate and t@Prate respectively. Some view t2 and Prate as most important statistics.

Example 1

Components:
Control formulation: Liquid silicone rubber base composition Silbione® LSR-4350, parts A and B, (standard LSR composition) sold by Elkem Silicones USA Corp.
$M^HQ$ silicone resin of $R_2HSiO_{1/2}$ and Q siloxy unit of formula $SiO_{4/2}$, formulas where H is a hydrogen atom and where R is methyl (wt. % of H as SiH=1.23%).

A control formulation was used according to the process of the invention with different amount of added MHQ silicone resin. A control test was performed with no added MHQ silicone resin as a comparative test. Cure was monitored on a Moving Die Rheometer (MDR) using ASTM-D5289, at 110° C. for 5 minutes. The results are quoted in Table 1.

TABLE 1

Measured Properties with added Resins

| | Comparative | Ex. 1 | Ex. 2 | Ex. 3 | Ex. 5 | Ex. 6 | Ex. 7 | Ex. 8 |
|---|---|---|---|---|---|---|---|---|
| ML | 0.01 | 0.01 | 0.01 | 0.01 | 0.01 | 0.01 | 0.02 | 0.01 |
| MH | 16.45 | 16.09 | 12.41 | 11.25 | 11.37 | 10.20 | 8.12 | 7.21 |
| t2, sec | 74 | 42 | 31 | 26 | 23 | 19 | 16 | 14 |
| t10, sec | 87 | 47 | 34 | 29 | 26 | 22 | 19 | 17 |

TABLE 1-continued

| | Measured Properties with added Resins | | | | | | | |
|---|---|---|---|---|---|---|---|---|
| | Comparative | Ex. 1 | Ex. 2 | Ex. 3 | Ex. 5 | Ex. 6 | Ex. 7 | Ex. 8 |
| t50, sec | 104 | 56 | 40 | 34 | 31 | 27 | 24 | 22 |
| t90, sec | 139 | 79 | 50 | 43 | 39 | 33 | 29 | 26 |
| t @ Prate, sec | 102 | 54 | 39 | 34 | 31 | 27 | 24 | 22 |
| Prate | 1626 | 3425 | 3765 | 3717 | 3923 | 3777 | 3215 | 3014 |
| Added catalyst by weight | 0% | 0.28% | 0.29% | 0.28% | 0.29% | 0.31% | 0.30% | 0.30% |
| % by weight of added $M^HQ$ silicone resin | 0% | 0.45% | 0.89% | 1.49% | 1.56% | 1.96% | 2.60% | 3.04% |
| Pot Life, hours | 16 | 16 | 16 | <16 >2 | <16 >2 | <16 >2 | <16 >2 | <16 >2 |

The comparative test exhibits a t90 (90% cure) value of 139s which is much slower than all the tests according to the invention

Example 2 a) Crosslinkers Tested

XL1=Polyphenyl-(dimethylhydrosiloxy)siloxane hydride terminated, from Gelest, reference HDP-111, viscosity 50 to 80 mPa·s, total SiH mmol/g=5.2; silicone resin of formulae $(M^H)_{2+n}(T^{Ph})_n$ with $M=R_2HSiO_{1/2}$ siloxy unit and $T^{Ph}=PhSiO_{3/2}$, formulas where H is a hydrogen atom, R is methyl and Ph is phenyl.

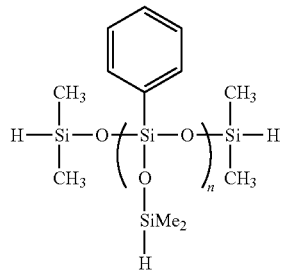

XL2: copolymer of dimethylsiloxane and methylhydrogensiloxane partially capped at both molecular terminals with di-methylhydrogensiloxy groups (viscosity of 18 to 26 mPa·s; total SiH mmol/g=7.2 (linear crosslinker).

XL3: MHQ silicone resin of $R_2HSiO_{1/2}$ and Q siloxy unit of formula $SiO_{4/2}$, formulas where H is a hydrogen atom and where R is methyl, total SiH mmol/g=7.3 (from Milliken, reference SiVance MQH-8 MQ Hydride Resin).

XL4: Branched silicone resin of formulae MHQ with $M^H=R_2HSiO_{1/2}$ and Q is a siloxy unit of formula $SiO_{4/2}$, formulas where H is a hydrogen atom and where R is methyl, total SiH mmol/g=8.8.

XL5: Branched silicone resin of formulae MHQ with $M^H=R_2HSiO_{1/2}$ and Q is a siloxy unit of formula $SiO_{4/2}$, formulas where H is a hydrogen atom and where R is methyl, total SiH mmol/g=9.7 (reference SiVance MQH-9 MQ Hydride Resin from Milliken).

XL6: Branched silicone resin of formulae: $(M^H)_3(T^{Ph})$ with $M=R_2HSiO_{1/2}$ siloxy unit and $T^{Ph}=PhSiO_{3/2}$, formulas where H is a hydrogen atom, R is methyl and Ph is phenyl, from Gelest reference SIP6826.0, phenyltris(dimethylhydrosiloxy)silane, total SiH mmol/g=5.2.

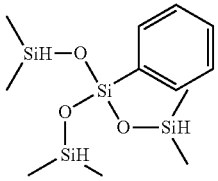

XL7: Branched silicone resin of formulae $M^HQ$ with $M^H=R_2HSiO_{1/2}$ and Q is a siloxy unit of formula $SiO_{4/2}$, formulas where H is a hydrogen atom and where R is methyl, total SiH mmol/g=6.7, from Gelest reference SIT7278.0, total SiH mmol/g=6.7.

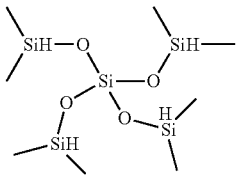

XL8: α,ω-bis(trimethylsiloxy) polymethylhydridesiloxane, viscosity from 17 to 27 mPa·s, total SiH mmol/g=15.7.

Composition of liquid silicone rubber base composition R:
- Polydimethylsiloxane with dimethylvinylsiloxy groups present at the terminal ends (viscosity range from 80,000 to 120,000 mPa·s): 35.74% by weight.
- Polydimethylsiloxane with dimethylvinylsiloxy groups present at the terminal ends (viscosity range from 55,000 to 65,000 mPa·s): 31.28% by weight.
- Silica fumed surface treated by divinyltetramethydisilazane and hexamethyldisilazane (in-situ treatment) (25.59% by weight)
- divinyltetramethyldisilazane and hexamethyldisilazane (overall=6.99% by weight)
- Plasticizer additive (0.40% by weight)

To prepare the formulations to be tested, separate feeds are prepared and combined in a mixing tank:
Feed 1) The liquid silicone rubber base composition R is prepared to which is added varied amounts of:
methylvinylsiloxane-dimethylsiloxane copolymer in which trimethylsiloxy groups are present at the terminal ends (viscosity of around 1,000 mPa·s)—FLD619;

methylvinylsiloxane-dimethylsiloxane copolymer in which dimethylvinylsiloxy groups present at the terminal ends (viscosity range from 350 to 420 mPa·s)—FLD-506;

Feed 2) a catalyst masterbatch (LSR SELECT CATA from Elkem Silicones);

Feed 3) an inhibitor masterbatch (LSR SELECT CONTROL from Elkem Silicones);

Feed 4) crosslinkers XL tested.

After mixing all the components, all pot lives were determined by a manual "Snap time" pot life test. That test begins as soon as the mixture is finished and concludes when elastic properties are first observed by an individual monitoring the mixture and manually stirring and lifting the mixture from its container. Elastic properties are observed when the mixture "snaps" back into the container.

Cure evaluations were done using a Paar-MC302 Rheometer with a temperature commencing at 40° C. and increasing at a rate of 7° C. per minute.

The cure data for each formulation was fitted to a logistic equation, the parameter of which are To and k. The logistic function used to fit data from the MDR (Moving Die Rheometer) is given in the following equation 1:

$$G'(T) = ML + \frac{MH - ML}{1 + e^{-k(T-T_o)}} \quad (1)$$

where: G'(T) the storage modulus as a function of the temperature
ML is the minimum observed value for G'
MH is the maximum observed value for G'
k is a coefficient related to the maximum slope of the curve
T is the temperature independent variable
To is the temperature at the vertical mid-point of the curve
The first derivative is:

$$\frac{dG'}{dt} = \frac{-k(-MH)e^{-k(T-T_o)}}{1 + 2e^{-k(T-T_o)} + (e^{(-k(T-T_o)})^2} \quad (2)$$

When T=To, the mid or inflection point the temperature is To. The exponent expressions become $e^0=1$; thereby making the derivative:

$$\frac{dG'}{dt} = \frac{k(MH)}{4}; T = T_o \quad (3)$$

T0 is a parameter of the logistic function. This is described above. It is the point on the horizontal axis that corresponds to the inflection point of the curve. This is also the point at which the maximum rate of cure is achieved.

Once mixed these formulations were tested on a Paar MC 302 Rheometer using an oscillatory torsional strain of 1%. The platens are 25 mm diameter with a gap of 0.5 mm. The sinusoidal oscillatory frequency was 1 Hz. The temperature began at 40° C. and increased at 7° C./minute to a maximum temperature of 140° C. Each test lasted 18 minutes. As the temperature was increased, torque measurements were made at 18-second intervals. These measurements were resolved into the in-phase and the out-of-phase components of torque and ultimately into storage modulus, loss modulus, G' and G" respectively.

The composition of the formulations (% by weight for each component) with various values of RHAlk and the measured properties are quoted in Tables 2, 3 and 4.

TABLE 2

Measured Properties with RHAlk = 1.5.

| Formulations | 1 | 2 | 3 | 4 | 5 | 6 | 7 | 8 |
|---|---|---|---|---|---|---|---|---|
| Silicone Base A | 88.30% | 88.95% | 89.08% | 89.32% | 89.55% | 88.33% | 88.91% | 90.06% |
| FLD619 (vinyl silicone fluid) | 2.51% | 2.51% | 2.51% | 2.51% | 2.51% | 2.51% | 2.51% | 2.51% |
| FLD-506 (vinyl silicone fluid) | 4.49% | 4.49% | 4.49% | 4.49% | 4.49% | 4.49% | 4.49% | 4.49% |
| LSR SELECT CONTROL | 1.00% | 1.00% | 1.00% | 1.00% | 1.00% | 1.00% | 1.00% | 1.00% |
| LSR SELECT CATA | 1.00% | 1.00% | 1.00% | 1.00% | 1.00% | 1.00% | 1.00% | 1.00% |
| XL1 | 2.70% | — | — | — | — | — | — | — |
| XL2 | — | 2.05% | — | — | — | — | — | — |
| XL3 | — | — | 1.92% | — | — | — | — | — |
| XL4 | — | — | — | 1.68% | — | — | — | — |
| XL5 | — | — | — | — | 1.45% | — | — | — |
| XL6 | — | — | — | — | — | 2.67% | — | — |
| XL7 | — | — | — | — | — | — | 2.09% | — |
| XL8 | — | — | — | — | — | — | — | 0.94% |
| RHalk | 1.5 | 1.5 | 1.5 | 1.5 | 1.5 | 1.5 | 1.5 | 1.5 |
| Crosslinker | XL1 | XL2 | XL3 | XL4 | XL5 | XL6 | XL7 | XL8 |
| Pot Life, minutes | 28 | 18 | 22 | 17 | 14 | 25 | 16 | 7 |
| G' @ ML, Pa | 1692 | 18999 | 8121 | 14717 | 6748 | 3934 | 10168 | 4963 |
| G' @ MH, Pa | 193360 | 300790 | 269950 | 241230 | 253490 | 114490 | 163680 | 843960 |
| T2 | 75.3° C. | 84.6° C. | 76.4° C. | 70.6° C. | 79.3° C. | 65.9° C. | 76.2° C. | 91.5° C. |
| T90 | 85.5° C. | 98.2° C. | 105.7° C. | 90.8° C. | 94.0° C. | 74.8° C. | 89.8° C. | 108.4° C. |
| To | 83.3° C. | 94.8° C. | 97.3° C. | 87.6° C. | 90.7° C. | 73.6° C. | 86.1° C. | 102.3° C. |
| Max Rate, Pa/s | 4,884 | 4,938 | 2,148 | 4,690 | 4,172 | 4,378 | 2,578 | 11,388 |
| k | 0.86602 | 0.56288 | 0.27278 | 0.66654 | 0.56451 | 1.31099 | 0.54009 | 0.46262 |

It can be noted that crosslinkers XL-1 and XL-6 which are branched silicone resins comprising $M^H$ siloxy units of formula $R_2HSiO_{1/2}$ and $T^{Ph}$ siloxy unit of formula (Ph)$SiO_{3/2}$ allow to cure at low temperatures (T0 below 85° C.) with the lowest values of T0 (the point at which the maximum rate of cure is achieved) and with an improved potlife (25 and 28 minutes respectively) compared to the other crosslinkers. This allow more freedom to use such XL and to overmold over heat sensitive materials having a Vicat Softening Temperature such as: polyvinyl chloride (PVC, 92° C.), polyethylene (PE, 127.3° C.), polypropylene (PP, 152.2° C.), acrylonitrile butadiene styrene (ABS, 102.3° C.) and polycarbonate (PC, 156.2° C.).

The same results are quoted in the following Tables 3 and 4

TABLE 3

| Measured Properties with RHAlk = 2.0 | | | | | | | | |
|---|---|---|---|---|---|---|---|---|
| Formulations | 9 | 10 | 11 | 12 | 13 | 14 | 15 | 16 |
| Silicone Base A | 87.40% | 88.26% | 88.45% | 88.77% | 89.08% | 87.46% | 88.23% | 89.75% |
| FLD619 (vinyl silicone fluid) | 2.51% | 2.51% | 2.51% | 2.51% | 2.51% | 2.51% | 2.51% | 2.51% |
| FLD-506 (vinyl silicone fluid) | 4.49% | 4.49% | 4.49% | 4.49% | 4.49% | 4.49% | 4.49% | 4.49% |
| LSR SELECT CONTROL | 1.00% | 1.00% | 1.00% | 1.00% | 1.00% | 1.00% | 1.00% | 1.00% |
| LSR SELECT CATA | 1.00% | 1.00% | 1.00% | 1.00% | 1.00% | 1.00% | 1.00% | 1.00% |
| XL1 | 3.60% | — | — | — | — | — | — | — |
| XL2 | — | 2.74% | — | — | — | — | — | — |
| XL3 | — | — | 2.55% | — | — | — | — | — |
| XL4 | — | — | — | 2.23% | — | — | — | — |
| XL5 | — | — | — | — | 1.92% | — | — | — |
| XL6 | — | — | — | — | — | 3.54% | — | — |
| XL7 | — | — | — | — | — | — | 2.77% | — |
| XL8 | — | — | — | — | — | — | — | 1.25% |
| RHalk | 2.0 | 2.0 | 2.0 | 2.0 | 2.0 | 2.0 | 2.0 | 2.0 |
| Crosslinker | XL1 | XL2 | XL3 | XL4 | XL5 | XL6 | XL7 | XL8 |
| Pot Life, minutes | 26 | 13 | 16 | 12 | 13 | 21 | 16 | 7 |
| G' @ ML, Pa | 13259 | 502 | 8599 | 668 | 13473 | 16213 | 17470 | 12458 |
| G' @ MH, Pa | 721380 | 203800 | 303760 | 210400 | 709360 | 70817 | 633010 | 916360 |
| T2 | 68.4° C. | 82.0° C. | 79.7° C. | 75.3° C. | 78.3° C. | 70.4° C. | 73.3° C. | 84.5° C. |
| T90 | 81.3° C. | 93.9° C. | 94.5° C. | 85.7° C. | 88.8° C. | 76.0° C. | 85.4° C. | 98.6° C. |
| To | 79.4° C. | 91.7° C. | 91.3° C. | 83.7° C. | 87.0° C. | 74.6° C. | 83.4° C. | 96.5° C. |
| Max Rate, Pa/s | 23,165 | 4,919 | 5,367 | 5,702 | 20,677 | 2,708 | 17,421 | 25,917 |
| k | 1.10099 | 0.82750 | 0.60570 | 0.92909 | 0.99937 | 1.31099 | 0.94360 | 0.96969 |

TABLE 4

| Measured Properties with RHAlk = 2.5 | | | | | | | | |
|---|---|---|---|---|---|---|---|---|
| Formulations | 17 | 18 | 19 | 20 | 21 | 22 | 23 | 24 |
| Silicone Base A | 86.50% | 87.58% | 87.82% | 88.21% | 88.60% | 86.60% | 87.55% | 89.43% |
| FLD619 (vinyl silicone fluid) | 2.51% | 2.51% | 2.51% | 2.51% | 2.51% | 2.51% | 2.51% | 2.51% |
| FLD-506 (vinyl silicone fluid) | 4.49% | 4.49% | 4.49% | 4.49% | 4.49% | 4.49% | 4.49% | 4.49% |
| LSR SELECT CONTROL | 1.00% | 1.00% | 1.00% | 1.00% | 1.00% | 1.00% | 1.00% | 1.00% |
| LSR SELECT CATA | 1.00% | 1.00% | 1.00% | 1.00% | 1.00% | 1.00% | 1.00% | 1.00% |
| XL1 | 4.50% | — | — | — | — | — | — | — |
| XL2 | — | 3.42% | — | — | — | — | — | — |
| XL3 | — | — | 3.18% | — | — | — | — | — |
| XL4 | — | — | — | 2.79% | — | — | — | — |
| XL5 | — | — | — | — | 2.40% | — | — | — |
| XL6 | — | — | — | — | — | 4.40% | — | — |
| XL7 | — | — | — | — | — | — | 3.45% | — |
| XL8 | — | — | — | — | — | — | — | 1.57% |
| RHalk | 2.5 | 2.5 | 2.5 | 2.5 | 2.5 | 2.5 | 2.5 | 2.5 |
| Crosslinker | XL1 | XL2 | XL3 | XL4 | XL5 | XL6 | XL7 | XL8 |
| Pot Life, minutes | 22 | 10 | 11 | 10 | 11 | 19 | 14 | 5 |
| G' @ ML, Pa | 4244 | 3841 | 12490 | 10020 | 2793 | 751 | 688 | 6154 |
| G' @ MH, Pa | 462890 | 701900 | 724880 | 778230 | 614270 | 12036 | 117720 | 683340 |
| T2 | 69.6° C. | 82.2° C. | 77.8° C. | 77.9° C. | 71.5° C. | 63.9° C. | 70.1° C. | 87.9° C. |

TABLE 4-continued

| | Measured Properties with RHAlk = 2.5 | | | | | | | |
|---|---|---|---|---|---|---|---|---|
| Formulations | 17 | 18 | 19 | 20 | 21 | 22 | 23 | 24 |
| T90 | 79.0° C. | 92.0° C. | 87.1° C. | 87.0° C. | 80.4° C. | 72.7° C. | 80.2° C. | 97.6° C. |
| To | 77.7° C. | 90.2° C. | 85.4° C. | 85.3° C. | 79.1° C. | 70.6° C. | 78.2° C. | 96.0° C. |
| Max Rate, Pa/s | 17,050 | 22,898 | 23,277 | 27,210 | 23,488 | 312 | 3,267 | 26,129 |
| k | 1.26290 | 1.11848 | 1.10099 | 1.19877 | 1.31099 | 0.88923 | 0.95139 | 1.31099 |

The invention claimed is:

1. A method useful for producing a molded silicone rubber product M1 via injection molding comprising:
   a) feeding into a base feed line a liquid silicone rubber base composition A1 which does not contain a catalyst, and which comprises:
      at least one organopolysiloxane A containing at least 2 alkenyl groups bonded to silicon atoms per molecule,
      optionally at least one organopolysiloxane B containing at least 2 silicon-bonded hydrogen atoms per molecule B; and optionally at least 3 silicon-bonded hydrogen atoms per molecule B,
      optionally, at least one filler C,
      optionally at least one inhibitor E for hydrosilylation vulcanizing reaction, and
      optionally at least one additive F,
   b) feeding into a separate catalyst feed line a catalyst masterbatch C1 comprising at least one platinum-based catalyst D,
   c) feeding into a separate feed line an inhibitor masterbatch E1 comprising at least one inhibitor E for hydrosilylation vulcanizing reaction,
   d) feeding either into a separate feed line or into any feedline containing the catalyst masterbatch C1 or the inhibitor masterbatch E1 at least one crosslinker XL which is an organopolysiloxane containing at least three silicon-bonded hydrogen atoms per molecule when it is a linear or a cyclic polymer or at least two silicon-bonded hydrogen atoms per molecule when it is a branched polymer,
   e) optionally feeding into a separate additive feed line at least one additive F,
   f) directing said liquid silicone rubber base composition A1, said catalyst masterbatch C1, said crosslinker XL, said inhibitor masterbatch E1 and optionally said additive F either into a mixing tank prior to directing the resulting mixture into a barrel of an injection machine or directly into said barrel to obtain a crosslinkable liquid silicone rubber composition A3 comprising:
      1) At least one organopolysiloxane A containing at least 2 alkenyl groups bonded to silicon atoms per molecule,
      2) optionally at least organopolysiloxane B containing at least 2 silicon-bonded hydrogen atoms per molecule B; and optionally at least 3 silicon-bonded hydrogen atoms per molecule B,
      3) optionally, at least one filler C,
      4) at least one platinum-based catalyst D,
      5) at least one inhibitor E for hydrosilylation vulcanizing reaction,
      6) at least one crosslinker XL which is an organopolysiloxane containing at least three silicon-bonded hydrogen atoms per molecule when it is a linear or a cyclic polymer or at least two silicon-bonded hydrogen atoms per molecule when it is a branched polymer, and
      7) optionally at least one additive F; and
   wherein the added amounts in said crosslinkable liquid silicone rubber composition A3 of said platinum-based catalyst D and said inhibitor E for hydrosilylation vulcanizing reaction are controlled and adjusted so as to get a molar ratio of the inhibitor E for hydrosilylation vulcanizing reaction to platinum atom of the platinum-based catalyst D which ranges from 0.1 to 900 (0.1:1 to 900:1), optionally from 10 to 900 (10:1 to 900:1), and optionally from 20 to 250 (20:1 to 250:1),
   g) directing said crosslinkable liquid silicone rubber composition A3 into a mold which is installed in a molding press and curing it, optionally by heating at a temperature ranging from 80° C. to up to 220° C., so as to obtain a molded silicone rubber product M1.

2. A method according to claim 1 comprising:
   a) feeding into a base feed line a liquid silicone rubber base composition A1 which does not contain a catalyst, and which comprises:
      at least one organopolysiloxane A containing at least 2 alkenyl groups bonded to silicon atoms per molecule,
      optionally at least one organopolysiloxane B containing at least 2 silicon-bonded hydrogen atoms per molecule B; and optionally at least 3 silicon-bonded hydrogen atoms per molecule B,
      optionally, at least one filler C,
      optionally at least one inhibitor E for hydrosilylation vulcanizing reaction, and
      optionally at least one additive F,
   b) feeding into a separate catalyst feed line a catalyst masterbatch C1 comprising at least one platinum-based catalyst D,
   c) feeding into a separate feed line an inhibitor masterbatch E1 comprising at least one inhibitor E for hydrosilylation vulcanizing reaction,
   d) feeding into a separate feed line at least one crosslinker XL which is an organopolysiloxane containing at least three silicon-bonded hydrogen atoms per molecule when it is a linear or a cyclic polymer or at least two silicon-bonded hydrogen atoms per molecule when it is a branched polymer,
   e) optionally feeding into a separate additive feed line at least one additive F,
   f) directing said liquid silicone rubber base composition A1, said catalyst masterbatch C1, said crosslinker XL, said inhibitor masterbatch E1 and optionally said additive F either into a mixing tank prior to directing the resulting mixture into a barrel of an injection machine or directly into said barrel to obtain a crosslinkable liquid silicone rubber composition A3 comprising:

1) At least one organopolysiloxane A containing at least 2 alkenyl groups bonded to silicon atoms per molecule,
2) optionally at least organopolysiloxane B containing at least 2 silicon-bonded hydrogen atoms per molecule B; and optionally at least 3 silicon-bonded hydrogen atoms per molecule B,
3) optionally, at least one filler C,
4) at least one platinum-based catalyst D,
5) at least one inhibitor E for hydrosilylation vulcanizing reaction,
6) At least one crosslinker XL which is an organopolysiloxane containing at least three silicon-bonded hydrogen atoms per molecule when it is a linear or a cyclic polymer or at least two silicon-bonded hydrogen atoms per molecule when it is a branched polymer, and
7) optionally at least one additive F; and
wherein the added amounts in said crosslinkable liquid silicone rubber composition A3 of said platinum-based catalyst D and said inhibitor E for hydrosilylation vulcanizing reaction are controlled and adjusted so as to get a molar ratio of the inhibitor E for hydrosilylation vulcanizing reaction to platinum atom of the platinum-based catalyst D which ranges from 0.1 to 900 (0.1:1 to 900:1), optionally from 10 to 900 (10:1 to 900:1), and optionally from 20 to 250 (20:1 to 250:1),
g) directing said crosslinkable liquid silicone rubber composition A3 into a mold which is installed in a molding press and curing it, optionally by heating at a temperature ranging from 80° C. to up to 220° C., so as to obtain a molded silicone rubber product M1.

3. A method according to claim 1 wherein the crosslinker XL is a branched silicone resin comprising $M^H$ siloxy units of formula $R_2HSiO_{1/2}$ and either Q siloxy unit of formula $SiO_{4/2}$ or $T^{Ph}$ siloxy unit of formula $(Ph)SiO_{3/2}$, formulas where Ph is a phenyl group, H is a hydrogen atom and where R is a one to forty carbon atom monovalent hydrocarbon radical, optionally a one to twenty carbon monovalent hydrocarbon radical, optionally selected from the group consisting of methyl, ethyl, propyl, iso-propyl, n-butyl, iso-butyl, sec-butyl, tert-butyl, pentyl, hexyl, heptyl, phenyl, benzyl, and mesityl; and optionally selected from the group consisting of methyl and phenyl.

4. A method according to claim 1 wherein the crosslinker XL is a mixture containing:
a) at least one branched silicone resin comprising at least two, and optionally at least three, $M^H$ siloxy units of formula $R_2HSiO_{1/2}$ and $T^{Ph}$ siloxy unit of formula $(Ph)SiO_{3/2}$, formulas where Ph is a phenyl group, H is a hydrogen atom and where R is a one to forty carbon atom monovalent hydrocarbon radical, optionally a one to twenty carbon monovalent hydrocarbon radical, optionally selected from the group consisting of methyl, ethyl, propyl, iso-propyl, n-butyl, iso-butyl, sec-butyl, tert-butyl, pentyl, hexyl, heptyl, phenyl, benzyl, and mesityl; and optionally selected from the group consisting of methyl and phenyl, and
b) at least one linear organopolysiloxane B containing at least 3 silicon-bonded hydrogen atoms per molecule and/or a branched $M^HQ$ silicone resin comprising at least two, and optionally at least three, $M^H$ siloxy units of formula $R_2HSiO_{1/2}$ and Q siloxy unit of formula $SiO_{4/2}$, formulas where H is a hydrogen atom and where R is a one to forty carbon atom monovalent hydrocarbon radical, optionally a one to twenty carbon monovalent hydrocarbon radical, optionally selected from the group consisting of methyl, ethyl, propyl, iso-propyl, n-butyl, iso-butyl, sec-butyl, tert-butyl, pentyl, hexyl, heptyl, phenyl, benzyl, and mesityl; and optionally selected from the group consisting of methyl and phenyl.

5. A method according to claim 1 wherein the crosslinker XL is a $M^HQ$ silicone resin comprising $M^H$ siloxy units of formula $R_2HSiO_{1/2}$ and Q siloxy unit of formula $SiO_{4/2}$, formulas where H is a hydrogen atom and where R is a one to forty carbon atom monovalent hydrocarbon radical, optionally a one to twenty carbon monovalent hydrocarbon radical, optionally selected from the group consisting of methyl, ethyl, propyl, iso-propyl, n-butyl, iso-butyl, sec-butyl, tert-butyl, pentyl, hexyl, heptyl, phenyl, benzyl, and mesityl; and optionally selected from the group consisting of methyl and phenyl.

6. A method according to claim 5 wherein the crosslinker XL is a silicone resin having from 0.10 wt. % to 2.00 wt. % H as SiH and comprising $M^H$ siloxy units of formula $R_2HSiO_{1/2}$ and Q siloxy unit of formula $SiO_{4/2}$, where H is a hydrogen atom and R is a one to forty carbon atom monovalent hydrocarbon radical, optionally a one to twenty carbon monovalent hydrocarbon radical, optionally selected from the group consisting of methyl, ethyl, propyl, iso-propyl, n-butyl, iso-butyl, sec-butyl, tert-butyl, pentyl, hexyl, heptyl, phenyl, benzyl, and mesityl; and optionally selected from the group consisting of methyl and phenyl.

7. A method according to claim 1 wherein the crosslinker XL is a $M^HQ$ silicone resin having the formula:

$$M^H_w Q_z$$

where Q has the formula $SiO_{4/2}$ and where $M^H$ has the formula $R_2HSiO_{1/2}$, where H is a hydrogen atom and R is a one to forty carbon atom monovalent hydrocarbon radical, optionally a one to twenty carbon monovalent hydrocarbon radical, optionally selected from the group consisting of methyl, ethyl, propyl, iso-propyl, n-butyl, iso-butyl, sec-butyl, tert-butyl, pentyl, hexyl, heptyl, phenyl, benzyl, and mesityl; and optionally selected from the group consisting of methyl and phenyl, with the subscripts w and z having a ratio of 0.5 to 4.0 respectively, optionally 0.6 to 3.5, optionally 0.75 to 3.0, and optionally 1.0 to 3.0.

8. A method according to claim 1 wherein in d) the quantity of the crosslinker XL added is controlled and maintained within the range of 0.1 to 5.0% by weight percent, based on the weight of the crosslinkable liquid silicone rubber composition A3.

9. A method according to claim 1 wherein in g) the curing temperature is of from 80 to 140° C. and optionally is of from 90 to 130° C.

10. A method according to claim 1 wherein in g) the curing temperature is of from 80 to 140° C. and optionally is of from 90 to 130° C.; and said crosslinkable liquid silicone rubber composition A3 is cured around or over a substrate P to form a composite part comprising said molded silicone rubber product M1.

11. The method of claim 10 wherein the substrate P is selected from plastic substrates, thermoplastic substrates, metal substrates, and textile substrates and optionally the substrate P is polyvinyl chloride (PVC), polyethylene (PE), polypropylene (PP), acrylonitrile butadiene styrene (ABS) or polycarbonate (PC).

12. A method according to claim 1 wherein the inhibitor E for hydrosilylation vulcanizing reaction is selected from the group consisting of 1-ethynyl-1-cyclohexanol, 2-methyl-3-butyn-2-ol, 3-butyn-1-ol, 3-butyn-2-ol, propargylalcohol, 2-phenyl-2-propyn-1-ol, 3,5-dimethyl-1-hexyn-3-ol, 1-ethynylcyclopentanol, 1-phenyl-2-propynol, 3-methyl-1-penten-4-yn-3-ol, and mixtures thereof.

* * * * *